(12) United States Patent
Watanabe et al.

(10) Patent No.: US 11,855,368 B2
(45) Date of Patent: Dec. 26, 2023

(54) ELECTRICAL CONNECTING MEMBER, AND GLASS PLATE STRUCTURE WITH TERMINAL

(71) Applicant: SEKISUI POLYMATECH CO., LTD., Saitama (JP)

(72) Inventors: Yasuyoshi Watanabe, San Jose, CA (US); Hideaki Konno, Koshigaya (JP); Tsubasa Kamiya, Saitama (JP); Tatsuya Kogiso, Hikone (JP)

(73) Assignee: SEKISUI POLYMATECH CO., LTD., Saitama (JP)

( * ) Notice: Subject to any disclaimer, the term of this patent is extended or adjusted under 35 U.S.C. 154(b) by 297 days.

(21) Appl. No.: 17/605,083

(22) PCT Filed: Apr. 24, 2020

(86) PCT No.: PCT/JP2020/017718
§ 371 (c)(1),
(2) Date: Oct. 20, 2021

(87) PCT Pub. No.: WO2020/218520
PCT Pub. Date: Oct. 29, 2020

(65) Prior Publication Data
US 2022/0190496 A1   Jun. 16, 2022

(30) Foreign Application Priority Data

Apr. 26, 2019  (JP) .................................. 2019-086817

(51) Int. Cl.
*H01R 12/57* (2011.01)
*H01R 11/01* (2006.01)
(Continued)

(52) U.S. Cl.
CPC ............. *H01R 12/57* (2013.01); *H01R 11/01* (2013.01); *H01R 12/7041* (2013.01); *H01R 13/2414* (2013.01); *B60J 1/00* (2013.01)

(58) Field of Classification Search
CPC . B60J 1/00; H01R 11/01; H01R 12/57; H01R 12/7041; H01R 13/2414
See application file for complete search history.

(56) References Cited

U.S. PATENT DOCUMENTS 7,833,070 B2   11/2010  Lyon
9,997,846 B1    6/2018  Salter et al.
(Continued)

FOREIGN PATENT DOCUMENTS

CN       1649963    8/2005
CN     101120257    2/2008
(Continued)

OTHER PUBLICATIONS

Extended European Search Report dated Feb. 21, 2023 in corresponding European Patent Application No. 20794472.9.
(Continued)

*Primary Examiner* — Nathan Milakovich
(74) *Attorney, Agent, or Firm* — Wenderoth, Lind & Ponack, L.L.P.

(57) ABSTRACT

An electric connection member comprises a conductive member, a fixing member which brings the conductive member into contact with a connection target member and holds the conductive member in a state of compression in a thickness direction Z. The conductive member has a compressive stress of 1.0 N/mm² or more and 15.0 N/mm² or less when compressed by 25% in the thickness direction. The fixing member has an elongation of 400 μm or less when drawn at 96 kPa for 30 minutes in a direction along the thickness direction Z.

14 Claims, 7 Drawing Sheets

(51) Int. Cl.
    *H01R 12/70*     (2011.01)
    *H01R 13/24*     (2006.01)
    *B60J 1/00*     (2006.01)

(56) References Cited

U.S. PATENT DOCUMENTS

| | | |
|---|---|---|
| 2005/0239940 A1 | 10/2005 | Shima et al. |
| 2011/0109115 A1 | 5/2011 | Yamada et al. |
| 2015/0155646 A1 | 6/2015 | Takeuchi et al. |
| 2016/0190712 A1 | 6/2016 | Hirooka et al. |
| 2016/0326407 A1 | 11/2016 | Iwasaki et al. |
| 2021/0043997 A1* | 2/2021 | Imeson ................ H01Q 1/1271 |
| 2021/0359434 A1* | 11/2021 | Watanabe ................. B32B 3/18 |
| 2022/0190494 A1* | 6/2022 | Konno ................... H01R 12/57 |
| 2022/0190496 A1* | 6/2022 | Watanabe ................ H05B 3/84 |
| 2022/0255242 A1* | 8/2022 | Kamiya ................. H01R 12/57 |

FOREIGN PATENT DOCUMENTS

| | | |
|---|---|---|
| CN | 105453349 | 3/2016 |
| CN | 105555894 | 5/2016 |
| JP | 2007-227111 | 9/2007 |
| JP | 2010-20918 | 1/2010 |
| JP | 2012-43690 | 3/2012 |
| WO | 2014/024980 | 2/2014 |
| WO | 2018/116844 | 6/2018 |

OTHER PUBLICATIONS

International Search Report dated Jul. 7, 2020 in International (PCT) Application No. PCT/JP2020/017718.

\* cited by examiner (a)

(b)

ELECTRICAL CONNECTING MEMBER, AND GLASS PLATE STRUCTURE WITH TERMINAL

TECHNICAL FIELD

The present invention relates to an electric connection member, and a terminal-equipped glass plate structure which comprises an electric connection member.

BACKGROUND ART

An automotive windowpane is provided with, for example, a defroster, a defogger or the like, and therefore requires that a power feeding portion called a bus-bar or the like be formed on a glass plate, and a terminal comprising a metal plate etc. be connected to the power feeding portion. For connection of the terminal to the power feeding portion, solder has been heretofore widely used. For example, as disclosed in Patent Literature 1, an electric connection member having conductive rubber as a conductive member has been examined for its use as an alternative to solder. In Patent Literature 1, electric connection between a terminal and a power feeding portion is secured by holding the conductive member with an adhesive layer composed of a double-sided adhesive, a thermosetting adhesive, or a thermoplastic adhesive with the conductive member contacting both the terminal and the power feeding portion.

As disclosed in Patent Literature 2, a connector sheet comprising a sheet portion having an electric insulation quality and a conduction portion provided on the sheet portion has been heretofore known. The connector sheet is used for electrically connecting a metal portion forming a housing for an electric device and an earth connection portion for a circuit board built in the housing, and is fixed to the circuit board with a pressure-sensitive adhesive portion interposed therebetween.

CITATION LIST

Patent Literature 1: Japanese Patent Laid-Open No. 2012-43690
Patent Literature 2: Japanese Patent Laid-Open No. 2007-227111

SUMMARY OF INVENTION

Technical Problem

However, when a metal terminal is fixed to a power feeding portion of a glass plate by solder, the solder is peeled by heat or degradation, so that the metal terminal is likely to fall. When a conductive member composed of conductive rubber is used as described in Patent Literature 1, it is necessary to compress the conductive member for securing electric connection, but when the conductive member is compressed, the electric connection member is likely to fall due to repulsion of the rubber.

Further, when conductive rubber is compressed and fixed by an adhesive layer, it may be impossible to sufficiently maintain the conductive rubber in a state of compression with use due to degradation of the conductive rubber or the adhesive layer, a change in use environment or the like. Thus, there is also a problem of increased electric resistance leading to temperature rise with time when a large amount of electric current is applied.

Meanwhile, the connector sheet described in Patent Literature 2 is aimed at ground connection of a metal portion of a housing to a circuit board, and is difficult to use for electrically connecting a metal terminal to a power feeding portion while fixing the metal terminal to the glass plate.

Accordingly, an object of the present invention is to prevent a problem of peeling of an electric connection member or a terminal mounted by the electric connection member from a connection target member, and increased electric resistance of the electric connection member leading to occurrence of temperature rise with time.

Solution to Problem

The present inventors have extensively conducted studies, and resultantly found that in an electric connection member comprising a conductive member and a fixing member, the above-described object can be achieved by controlling the compressive stress of the conductive member and the elongation of the fixing member in a thickness direction, leading to completion of the present invention. Specifically, the present invention provides the following [1] to [14].

[1] An electric connection member comprising: a conductive member; and a fixing member which brings the conductive member into contact with a connection target member and holds the conductive member in a state of compression in a thickness direction, wherein the conductive member has a compressive stress of 1.0 N/mm$^2$ or more and 15.0 N/mm$^2$ or less when compressed by 25% in the thickness direction, and the fixing member has an elongation of 400 μm or less when drawn at 96 kPa for 30 minutes in a direction along the thickness direction.

[2] An electric connection member comprising: a conductive member; and a fixing member which brings the conductive member into contact with a connection target member and holds the conductive member in a state of compression in a thickness direction, wherein the conductive member has a compressive stress of 0.5 N/mm$^2$ or more and 6.0 N/mm$^2$ or less when compressed in the thickness direction, held in a state of compressive deformation by 25% at 105° C. for 22 hours, then freed from the applied load, relieved from the compressive stress, and compressed by 25% in the thickness direction again, and the fixing member has an elongation of 400 μm or less when drawn at 96 kPa for 30 minutes in a direction along the thickness direction.

[3] The electric connection member according to [1] or [2], wherein the fixing member is a pressure-sensitive adhesive layer, or comprises a base material and a pressure-sensitive adhesive layer provided on each of both surfaces of the base material.

[4] The electric connection member according to [3], wherein the pressure-sensitive adhesive layer has an elongation ratio of 1000% or more at breakage in tension in a direction along the thickness direction, and an elastic modulus of 0.02 MPa or more.

[5] The electric connection member according to [3] or [4], wherein the base material has a loss tangent tan δ of 0.08 or less at 85° C. in evaluation of dynamic viscoelasticity in a tensile mode at 10 Hz.

[6] The electric connection member according to any one of [1] to [5], wherein the conductive member comprises a conductive portion having conductivity, and the conductive portion has a diameter of 1.0 to 3.0 mm.

[7] The electric connection member according to any one of [1] to [6], wherein the conductive member has a thickness of 0.2 to 1.5 mm.

[8] The electric connection member according to any one of [1] to [7], wherein the number of the conductive members is 1 to 10.
[9] The electric connection member according to any one of [1] to [8], wherein the conductive member comprises a generally conductive rubbery elastomer, and the rubbery elastomer comprises a conductive filler at 25 to 90 vol %.
[10] The electric connection member according to any one of [1] to [8], wherein the conductive member comprises a columnar conductive portion composed of a conductive rubbery elastomer, and an insulating portion surrounding the periphery of the columnar conductive portion and composed of an insulating rubbery elastomer, and the conductive rubbery elastomer forming the columnar conductive portion comprises a conductive tiller at 25 to 80 vol %.
[11] The electric connection member according to any one of [1] to [10], wherein the conductive member comprises a conductive portion comprising a conductive filler, and the conductive filler is arrayed in the thickness direction.
[12] The electric connection member according to any one of [1] to [11], wherein the conductive member is a rubbery elastomer covered externally with a conductive layer, or a metal spring.
[13] The electric connection member according to any one of [1] to [12], further comprising a joining member joining the conductive member to the fixing member.
[14] A terminal-equipped glass plate structure, comprising: the electric connection member according to any one of [1] to [13]; a glass plate having a conductive layer provided on at least one surface thereof and a terminal, wherein the electric connection member is disposed between the terminal and the conductive layer, the terminal is connected to the conductive layer through the conductive member, and the terminal is fixed to the glass plate by the fixing member.

Advantageous Effects of Invention

The present invention prevents a problem of peeling of an electric connection member or a terminal mounted by the electric connection member from a connection target member, and increased electric resistance of the electric connection member leading to occurrence of temperature rise with time.

DESCRIPTION OF EMBODIMENTS

Hereinafter, the present invention will be described in further detail.

First Embodiment

Figure 1:
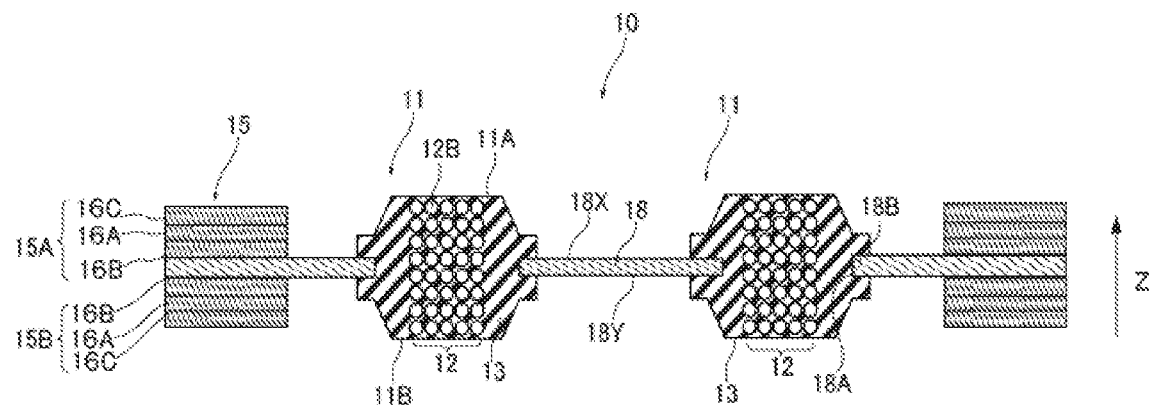
FIG. 1 is a sectional view of an electric connection member according to a first embodiment.
Figure 3:
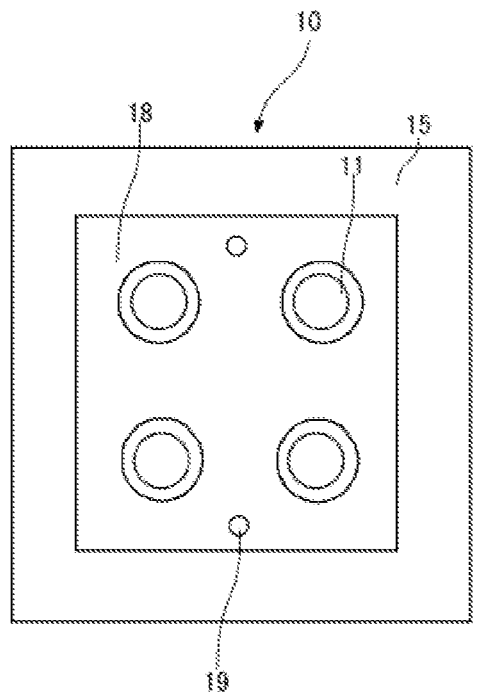
FIG. 3 is a plan view of the electric connection member according to the first embodiment.

As shown in FIGS. 1 and 3, an electric connection member 10 according to a first embodiment of the present invention comprises a conductive member 11 and a fixing member 15. The fixing member 15 brings the conductive member 11 into contact with a connection target member and holds the conductive member 11 in a state of compression in a thickness direction Z of the conductive member 11. The thickness direction Z is a direction coincident with a direction in which the electric connection member 10 becomes conductive when connected to the connection target member, and is also coincident with a thickness direction of the fixing member 15 and a joining member 18 described later.

In the present embodiment, the conductive member 11 has a compressive stress of 1.0 N/mm$^2$ or more and 15.0 N/mm$^2$ or less when compressed by 25% in the thickness direction Z (hereinafter, the compressive stress is also referred to as "first compressive stress"). The fixing member 15 has an elongation of 400 μm or less when drawn at 96 kPa for 30 minutes in a direction along the thickness direction Z.

In the present embodiment, since the first compressive stress of the conductive member 11 and the elongation of the fixing member 15 in a direction along the thickness direction Z are within the above-described ranges, the conductive member 11 can be held by the fixing member 15 for a long period of time in a state of being pressed against the connection target member with moderate strength. Thus, even long-term use is less likely to cause a problem of peeling of the electric connection member 10 or a terminal mounted by the electric connection member 10 from the connection target member, and increased electric resistance leading to occurrence of temperature rise.

On the other hand, if the first compressive stress is less than 1.0 N/mm$^2$, the connection target member cannot be pressed with sufficient strength even when the conductive member 11 is moderately compressed, and therefore connection to the connection target member becomes insufficient, leading to an increase in electric resistance. If the compressive stress is more than 15.0 N/mm$^2$, the repulsion of the compressed conductive member 11 against the connection target member becomes excessively high, so that a problem occurs, such as peeling of the electric connection member 10 or a terminal mounted by the electric connection member 10.

Further, if the elongation of the fixing member 15 is more than 400 μm, heating of the fixing member 15 or continuous application of internal pressure with use makes it difficult to maintain the thickness of the fixing member 15 below a specified level, so that connection of the conductive member 11 to the connection target member becomes insufficient. Thus, electric resistance of the conductive member 11 increases, leading to occurrence of temperature rise.

The first compressive stress is preferably 1.5 N/mm$^2$ or more, more preferably 2.0 N/mm$^2$ or more, still more preferably 2.5 N/mm$^2$ or more. When the first compressive stress of the conductive member 11 is equal to or greater than the above-described lower limit, the pressing strength against the connection target member of the electric connection member 10 becomes more appropriate, and even with long-term use, occurrence of temperature rise due to an increase in electric resistance can be effectively prevented.

The first compressive stress is preferably 12 N/mm$^2$ or less, more preferably 8.0 N/mm$^2$ or less, still more preferably 5.0 N/mm$^2$ or less. When the first compressive stress is equal to or less than the above-mentioned upper limit, peeling of the electric connection member 10 from the connection target member by repulsion can be further suppressed.

The elongation of the fixing member 15 is preferably 340 μm or less, more preferably 200 μm or less, still more preferably 95 μm or less. When the elongation is equal to or less than the above-mentioned upper limit, occurrence of temperature rise due to an increase in electric resistance can be effectively prevented even with long-term use of the electric connection member 10. The elongation of the fixing member 15 is not particularly limited, and is preferably 10 μm or more, more preferably 20 μm or more, still more preferably 30 μm or more, from the viewpoint of appropriately securing the adhesion of a pressure-sensitive adhesive layer described later.

In the present embodiment, a plurality of fixing members 15 are provided as described later. In such a case, each fixing member may have the above-described elongation, and when only one fixing member is provided as shown in another embodiment, the one fixing member may have the above-described elongation. The fixing member in the present embodiment is a double sided pressure-sensitive adhesive tape provided with a base material and an adhesive on each of both surfaces of the base material, and one double sided pressure-sensitive adhesive tape comprising the base material is taken as one fixing member, and the elongation is measured. The fixing member may be composed of a pressure-sensitive adhesive layer alone, and in this case, the elongation of the pressure-sensitive adhesive layer may be measured.

Further, in the present embodiment, the conductive member 11 may have a compressive stress of 0.5 N/mm$^2$ or more and 6.0 N/mm$^2$ or less when compressed in the thickness direction, held in a state of compressive deformation by 25% at 105° C. for 22 hours, then freed from the applied load, relieved from the compressive stress, and compressed by 25% in the thickness direction again (hereinafter, the compressive stress is also referred to as second compressive stress).

In the present invention, since the elongation of the conductive member 11 at the second compressive stress is within the above-described range, the conductive member 11 can have certain compressive stress even after long-term use, so that it is possible to prevent occurrence of peeling after long-term use and an increase in electric resistance. The elongation of the fixing member 15 when the second compressive stress is within the above-described range is as described above.

The second compressive stress is preferably 0.6 N/mm$^2$ or more, more preferably 0.7 N/mm$^2$ or more, still more preferably 0.8 N/mm$^2$ or more. When the second compressive stress of the conductive member 11 is equal to or greater than the above-described lower limit, the pressing strength of the electric connection member 10 against the connection target member becomes appropriate and occurrence of temperature rise due to an increase in electric resistance can be prevented even after long-term use.

The second compressive stress is preferably 5.0 N/mm$^2$ or less, more preferably 3.0 N/mm$^2$ or less, still more preferably 1.8 N/mm$^2$ or less. When the second compressive stress is equal to or less than the above-mentioned upper limit, peeling of the electric connection member 10 from the connection target member by repulsion is easily suppressed.

In the conductive member 11, one of the first and second compressive stresses may be within the above-described predetermined range. It is preferable that at least the first compressive stress be within the above-described predetermined range, and it is preferable that both the first and second compressive stresses be within the above-described range.

In the present invention, the first and second compressive stresses and the elongation in a direction along a conductivity direction Z of the fixing member can be measured by methods described in Examples below.

The electric connection member 10 of the present embodiment further comprises a joining member 18 which joins the conductive member 11 to the fixing member 15. The conductive member 11 and the fixing member 15 are integrated by the joining member 18 to form the electric connection member 10. The joining member 18 is provided with a through-hole 18A. The conductive member 11 is inserted into the through-hole 18A and fixed to the joining member 18.

Hereinafter, the members that form the electric connection member 10 will be described in further detail.

(Conductive Member)

The conductive member 11 comprises a conductive portion 12 having conductivity. The conductive portion 12 is composed of a conductive rubbery elastomer. More specifically, the conductive rubbery elastomer forming the conductive portion 12 has a large number of conductive fillers 12B in the rubbery elastomer as shown in FIG. 1.

Preferably, the conductive fillers 12B are arrayed so as to continue in the thickness direction of the electric connection member 10. More preferably, the conductive fillers 12B are magnetic, and are arrayed in a chain in the thickness direction Z by application of a magnetic field. Since the conductive fillers 12B are arrayed so as to continue in the thickness direction Z, it is possible to achieve low electric resistance while reducing compressive stress in compression by 25% described above.

The conductive portion 12 is normally formed in a columnar shape. The cross-sectional shape of the columnar shape is not particularly limited, and may be a circular shape or a polygonal shape such as a quadrangular shape, with a circular shape being preferable. The columnar conductive portion 12 is provided with a cylindrical insulating portion 13 surrounding the outer periphery thereof, and the insulating portion 13 and the conductive portion 12 are integrated to form the conductive member 11.

The insulating portion 13 is composed of an insulating rubbery elastomer. That is, the conductive member 11 is integrally formed by the rubbery elastomer, and at the center portion it has conductive fillers 12B that are arrayed so as to continue in the thickness direction as shown in FIG. 1. As shown in FIG. 1, the conductive member 11 may vary in outer diameter along the thickness direction Z. In the conductive member 11, the outer diameters of both end surfaces (upper surface 11A and lower surface 11B) are each smaller than the outer diameter of a portion therebetween as shown in, for example, FIG. 1. Thus, in the conductive member 11, both end surfaces 11A and 11B are easily compressed along the thickness direction Z when the outer diameters of both end surfaces 11A and 11B are small.

It is preferable that the conductive portion 12 has an electric resistance of 100 mΩ or less in compression by 25%. When the electric resistance is 100 mΩ or less, the conductive portion 12 is less likely to generate heat even when a large amount of electric current is applied. From such a viewpoint, the electric resistance is preferably 20 mΩ or less. The electric resistance is normally 0.1 mΩ or more because of the restriction on materials etc.

The electric resistance in compression by 25% can be obtained by applying an electric current generated from a constant-current source through the conductive portion 12 with the conductive portion 12 compressed by 25%, measuring a voltage, and then calculating an electric resistance value.

In the present embodiment, the electric connection member 10 has a plurality of conductive members 11. Since a plurality of conductive members 11 are provided, a terminal described later is electrically connected to a connection target member such as a conductive layer through a plurality of conductive members 11. Therefore, even when a large amount of electric current is applied between the terminal and the connection target member, the electric resistance of each conductive member 11 is kept low, and accordingly, temperature rise in the conductive member 11 is easily suppressed. When a plurality of conductive members 11 are provided, each conductive member 11 can be reduced in size. Thus, the load in compression of a plurality of conductive members 11 as a whole decreases, and therefore the terminal is less likely to be peeled by repulsion of the conductive member 11.

As shown in, for example, FIG. 3, a plurality of conductive members 11 (two conductive members in FIG. 3) arranged in one row are arranged in a plurality of rows (two rows in FIG. 3). The intervals between a plurality of conductive members 11 are each preferably 0.5 mm or more and 200 mm or less, more preferably 1 mm or more and 50 mm or less. When the interval between conductive members 11 is within the above-mentioned range, it is possible to secure insulation quality between adjacent conductive members 11 and 11 without increasing the size of the electric connection member 10 beyond necessity. The interval between conductive members 11 means the shortest distance between each conductive member 11 and its closest conductive member 11.

As described above, the conductive filler 12B is preferably a magnetic conductive filler. Examples of the material of the magnetic conductive filler include nickel, cobalt, iron, ferrite and alloys thereof, and the shape thereof is a granular shape, a fibrous shape, a strip shape, a wire shape or the like. Further, the conductive filler may be a highly conductive metal, resin or ceramic covered with a magnetic conductor, or a magnetic conductor covered with a highly conductive metal. Examples of the highly conductive metal include gold, silver, platinum, aluminum, copper, iron, palladium, chromium and stainless steel.

The mean particle size of the conductive filler 12B is preferably 1 to 200 µm, more preferably 5 to 100 µm, from the viewpoint of easily forming a serial state by application of a magnetic field, so that a conductor can be efficiently formed. The mean particle size means a particle size at 50% in terms of cumulative volume (D50) in a particle size distribution of the conductive filler which is determined by a laser diffraction/scattering method. One conductive filler may be used, or two or more may be used in combination.

The filling factor of the conductive filler 12B in the conductive portion 12 is, for example, 25 to 80 vol %, preferably 30 to 75 vol %. When the filling factor is within the above-mentioned range, it is possible to secure conductivity while imparting certain strength to the conductive portion 12. The filling factor means the volume ratio of the conductive filler 12B to the total volume of the conductive portion 12.

On the other hand, the insulating portion 13 is normally free of the conductive filler 12B, and the filling factor of the conductive filler in the insulating portion 13 is normally 0 vol %. However, as long as insulation quality is not impaired, the insulating portion 13 may comprise a small amount of the conductive filler 12B which is inevitably mixed in a production process thereof or the like. Therefore, for example, the filling factor of the conductive filler in the insulating portion 13 may be less than 5 vol %, and is preferably less than 1 vol %.

Examples of the rubbery elastomer that forms the conductive portion include thermosetting rubbers and thermoplastic elastomers. The thermosetting rubber is rubber which is cured and crosslinked when heated, and specific examples thereof include silicone rubber, natural rubber, isoprene rubber, butadiene rubber, acrylonitrile butadiene rubber, styrene-butadiene rubber, chloroprene rubber, nitrile rubber, butyl rubber, ethylene-propylene rubber, ethylene-propylene-diene rubber, acrylic rubber, fluorine rubber and urethane rubber. Of these, silicone rubber which is excellent in forming processability, electric insulation quality, weather resistance or the like is preferable.

Examples of the thermoplastic elastomer include styrene-based thermoplastic elastomers, olefin-based thermoplastic elastomers, ester-based thermoplastic elastomers, urethane-based thermoplastic elastomers, polyamide-based thermoplastic elastomers, vinyl chloride-based thermoplastic elastomers, fluorine thermoplastic elastomers and ionically crosslinked thermoplastic elastomers.

As the rubbery elastomer, one of those described above may be used, or two or more thereof may be used in combination.

Thermosetting rubber, thermoplastic elastomer and the like may also be used as the rubbery elastomer that forms the insulating portion 13, and specific examples and preferred examples thereof are as described above. Similarly, for the rubbery elastomer that form the insulating portion 13, one kind of rubbery elastomer may be used, or two or more kinds may be used in combination. Preferably, the rubbery elastomers that form the insulating portion 13 and the conductive portion 12 are integrally formed as described above. Therefore, it is preferable to use the same type of material as the rubbery elastomers that form the insulating portion 13 and the conductive portion 12. More preferably, both the rubbery elastomers that form the insulating portion 13 and the conductive portion 12 are silicone rubber.

From the viewpoint of easily arranging the conductive filler in the thickness direction by application of a magnetic field or the like, the rubbery elastomer is preferably one obtained by curing liquid rubber or one that can be melted by heating. The liquid rubber is one that is liquid at ordinary temperature (23° C.) and ordinary pressure (1 atm) before curing, any of liquid rubbers of those listed as thermosetting rubbers may be used as specific rubber, and of these, liquid silicone rubber is preferable. Examples of the rubbery elastomer that can be melted by heating include thermoplastic elastomers.

The hardness of the conductive portion 12 is preferably 30 to 87, more preferably 40 to 85, still more preferably 60 to 80. When the hardness is within the above-described range, the compressive stress of the conductive member in compression by 25% is easily adjusted to be within a desired range. From the same viewpoint, the hardness of the insulating layer 11 is preferably 20 to 50, more preferably 25 to 40.

The hardness of the conductive portion 12 is measured at 23° C. using a type A durometer in accordance with "Vulcanized Rubber and Thermoplastic Rubber Method for Determination of Hardness-Part 3: Durometer Hardness" described in JIS K6253-3: 2012.

The diameter of the conductive portion 12 in the conductive member 11 is, for example, 1.0 to 6.0 mm. When the diameter of the conductive member 12 is within the above-described range, the electric resistance in compression by 25% is easily set within a predetermined range. As a result, temperature rise in the conductive member 11 can be suppressed even when a large amount of electric current is applied between the upper surface 11A and the lower surface 11B of the conductive member 11 in compression. From these viewpoints, the diameter of the conductive portion 12 is preferably 1.0 to 3.0 mm, more preferably 1.5 to 2.6 mm. When the diameter of the conductive portion 12 varies along the thickness direction, it means an average of the diameter of the conductive portion 12 on the upper surface 11A and the diameter of the conductive portion 12 on the lower surface 11B. When the conductive portion 12 has a shape other than a circle, the diameter herein can be calculated as a diameter of a circle having an area equal to the area of the conductive portion 12.

The diameter of the conductive portion 12 is preferably 35 to 97% of the diameter of the conductive member 11. When this ratio is 35% or more, the electric resistance can be sufficiently reduced, and when this ratio is 97% or less, appropriate elasticity can be imparted to the conductive member 11. From these viewpoints, the ratio of the diameter of the conductive portion 12 to the diameter of the conductive member 11 is more preferably 50% or more, still more preferably 55% or more, even more preferably 60% or more, and more preferably 95% or less, still more preferably 80% or less. When the ratio is in the above-mentioned range, a large amount of electric current can be applied, and rubber elasticity is easily maintained over a long period of time to enable further stable conduction. When the diameter of the conductive member 11 varies along the thickness direction, it means an average of the diameter on the upper surface 11A and the diameter on the lower surface 11B.

The diameter of the conductive member 11 is not particularly limited, and is, for example, 1.1 to 8.0 mm, preferably 1.1 to 6.0 mm, more preferably 1.8 to 5.0 mm.

Further, the thickness of the conductive member 11 is not particularly limited, and is preferably 0.2 to 1.5 mm, more preferably 0.3 to 1.2 mm. When the thickness of the conductive member 11 is within the above-described range, the conductive member 11 is easily held in a state of compression by the fixing member 15 described later.

When the conductive member 11 is used while being held in a state of compression in the thickness direction, the compression ratio is not particularly limited, and is, for example, 5 to 40%, preferably 10 to 35%, more preferably 15 to 30%. The compression ratio can be calculated from the expression of $(H0-H1)/H0$, where $H0$ is a thickness of the conductive member 11 when a load is not applied, and $H1$ is a thickness of the compressed conductive member 11 during use.

(Fixing Member)

The fixing member 15 brings the conductive portion 12 of the conductive member 11 into contact with a connection target member and holds the conductive member 11 in a state of compression in the thickness direction. The fixing member 15 is a member for enabling both surfaces of the electric connection member 10 to be bonded to another member, and more specifically, the fixing member 15 comprises fixing members 15A and 15B provided on both surfaces 18X and 18Y, respectively, of the joining member 18.

Since the electric connection member 10 comprises the fixing member 15, it is possible to electrically connect connection target members such as the terminal and the conductive layer, etc. and reliably and easily fix the terminal to a mounting member (e.g. a glass plate) which is provided with the connection target members.

In the present embodiment, the fixing members 15 (i.e. fixing members 15A and 15B) are formed so as to surround a plurality of conductive members 11, and have a frame shape. In FIG. 3, the joining member 18 is formed in a quadrangular shape, and in conformation to this shape, the fixing members 15 (fixing members 15A and 15B) are formed in a quadrangular frame shape, but their shape is not limited to a quadrangular frame shape, and may be any shape.

Each of the intervals between the fixing members 15 (i.e. fixing members 15A and 15B) and the conductive members 11 is, for example, 0.1 to 10.0 mm, preferably 0.5 to 5.0 mm. The above-described interval is the shortest distance between each conductive portion 12 and each of the fixing members 15. When these intervals are each within the above-described range, pressure is likely to be uniformly applied to the conductive portions 12. The above-described intervals are preferably values close to one another. Therefore, the ratio of the maximum value to the minimum value of the intervals between the fixing members 15 (i.e. fixing members 15A and 15B) and the conductive members 11 is preferably 3 or less, more preferably 2 or less, still more preferably 1.5 or less.

The thickness of the fixing member 15 is, for example, 40 to 500 μm, preferably 60 to 400 μm, more preferably 100 to 300 μm. When the thickness of the fixing member 15 is equal to or less than the above-described upper limit, a change in resistance of the conductive portion is suppressed even when the environmental temperature rises or internal pressure is continuously applied. In addition, the flexibility of a tape for bonding rigid bodies (e.g. a terminal and a mounting member) to each other is secured. On the other hand, when the thickness of the fixing member 15 is equal to or greater than the lower limit, certain adhesion can be secured.

The width of the fixing member 15 is, for example, 1 to 30 mm, preferably 3 to 20 mm, more preferably 5 to 15 mm. When the width of the fixing member 15 is within the above-described range, it is possible to suppress the elongation of the fixing members in the thickness direction in actual use while securing bondability.

Each of the fixing members 15A and 15B comprises at least a pressure-sensitive adhesive layer composed of a pressure-sensitive adhesive. In the present embodiment, the fixing member is a double sided pressure-sensitive adhesive tape comprising a base material 16A and pressure-sensitive adhesive layers 16B and 16C provided on both surfaces of the base material 16A as shown in FIG. 1. Such a double sided pressure-sensitive adhesive tape having a base material is used for bonding to the joining member 18 with one pressure-sensitive adhesive layer 16B and bonding to another member with the other pressure-sensitive adhesive layer 16C. Since the fixing members 15A and 15B according to the present embodiment has the base material 16A, the elongation in the thickness direction is easily adjusted to be within the above-mentioned predetermined range even when the thickness increases.

The thickness of the base material 16A is, for example, 1.0 to 300 μm, preferably 20 to 200 μm, still more preferably 25 to 150 μm. When the thickness of the base material 16A is within the above-described range, the fixing member 15 has mechanical strength.

The thickness of each of the pressure-sensitive adhesive layers 16B and 16C is, for example, 5 to 100 μm, preferably 10 to 60 μm, still more preferably 1.5 to 50 μm. When the thickness of each of the pressure-sensitive adhesive layers 16B and 16C is within the above-described range, it is possible to suppress the elongation of the fixing members in the thickness direction while securing bondability.

The fixing members 15 (fixing members 15A and 15B) may have a configuration in which a plurality of double sided pressure-sensitive adhesive tapes are stacked. For example, as shown in FIG. 2(a), one fixing member 15B may have a configuration in which two fixing members $15B_1$ and $15B_2$ being double sided pressure-sensitive adhesive tapes are stacked. The fixing members $15B_1$ and $15B_2$ are double sided pressure-sensitive adhesive tapes comprising base materials $16A_1$ and $16A_2$, and pressure-sensitive adhesive layers $16B_1$, $16B_2$, $16C_1$ and $16C_2$ provided on both surfaces of the base materials $16A_1$ and $16A_2$. Similarly to the fixing member 15B, the fixing member 15A may have a configuration in which two fixing members $15A_1$ and $15A_2$ being double sided pressure-sensitive adhesive tapes are stacked as shown in FIG. 2(b). The fixing members $15A_1$ and $15A_2$ are double sided pressure-sensitive adhesive tapes comprising base materials $16A_1$ and $16A_2$, and pressure-sensitive adhesive layers $16B_1$, $16B_2$, $16C_1$ and $16C_2$ provided on both surfaces of the base materials $16A_1$ and $16A_2$.

The thickness of each of the base materials $16A_1$ and $16A_2$ is, for example, 5 to 50 μm, preferably 10 to 45 μm, still more preferably 15 to 40 μm. When the thickness of each of the base materials $16A_1$ and $16A_2$ is within the above-described range, it is possible to improve the flexibility of the fixing member 15.

The thickness of each of the pressure-sensitive adhesive layers $16B_1$, $16B_2$, $16C_1$ and $16C_2$ is, for example, 5 to 60 μm, preferably 10 to 55 μm, more preferably 15 to 50 μm. When the thickness of each of the pressure-sensitive adhesive layers $16B_1$, $16B_2$, $16C_1$ and $16C_2$ is within the above-described range, it is possible to suppress the elongation of the fixing member in the thickness direction while securing bondability.

When the fixing member 15 has a configuration in which a plurality of double sided pressure-sensitive adhesive tapes are stacked as mentioned above, thin base materials can be adopted as the base materials $16A_1$ and $16A_2$ of the double sided pressure-sensitive adhesive tape used, and the flexibility of the fixing member 15 is improved, so that the fixing member 15 can be fixed to another member with a small pressure of, for example, about 100 to 300 N. The fixing member 15 which can be fixed with a small pressure enables reduction of the area of air generated on the fixing surface during the fixation, so that it is possible to secure a sufficient fixing area, resulting in achievement of high adhesive strength.

It is preferable that each pressure-sensitive adhesive layer have an elongation ratio of 1000% or more at breakage in tension in a direction along the thickness direction Z and an elastic modulus of 0.02 MPa or more. When the elongation ratio and the elastic modulus are within the above-mentioned ranges, the elongation of the fixing member 15 in a direction along the thickness direction Z is easily set within a predetermined range while the adhesion is improved.

In the pressure-sensitive adhesive layer, the elongation ratio at breakage is more preferably 1100% or more, and the elastic modulus is preferably 0.022 MPa or more. In the pressure-sensitive adhesive layer, the elongation ratio at breakage is not particularly limited, and is, for example, 1500% or less, and the elastic modulus is, for example, 0.05 MPa or less.

It is preferable that the base material of the fixing member 15 have a loss tangent tan δ of 0.08 or less at 85° C. in evaluation of dynamic viscoelasticity in a tensile mode at 10 Hz. When the loss tangent tan δ at 85° C. is 0.08 or less, it is possible to prevent a situation in which when a load is applied to the base material of the fixing member 15 in the thickness direction, the load is absorbed, leading to an increase in elongation in the thickness direction. From these viewpoints, the loss tangent tan δ at 85° C. is preferably 0.07 or less, more preferably 0.04 or less. The lower limit of the loss tangent tan δ at 85° C. is not particularly limited, and is, for example, 0.01.

In the fixing members 15A and 15B, the elongation is adjusted to be within the above-described predetermined range by appropriately selecting the base material, the pressure-sensitive adhesive layer and the like.

Specific examples of the base material include resin films, paper base materials, nonwoven fabrics and foamed sheets. Of these, resin films and foamed sheets are preferable, and resin films are more preferable. When a resin film is used, the elongation is easily further reduced. In addition, the loss tangent tan δ at 85° C. is easily reduced.

Examples of the resin film include polyolefin-based resin films such as polyethylene films and polypropylene films, polyester-based resin films such as PET films, modified olefin-based resin films such as ethylene-vinyl acetate copolymer films and ethylene-acrylate copolymer films, polyvinyl chloride-based resin films, polyurethane-based resin films, cycloolefin polymer resin films, acryl-based resin films, polycarbonate-based resin films, ABS (acrylonitrile-butadiene-styrene) resin films, polyamide-based resin films and polyimide-based resin films. Of these, PET films are preferable from the viewpoint of heat resistance.

Examples of the foamed sheet include polyolefin-based foamed sheets such as polyethylene-based foamed sheets, polypropylene-based foamed sheets, acryl-based foamed sheets, urethane-based foamed sheets, and rubber-based foamed sheets such as ethylene propylene diene rubber-based foamed sheets. Of these, polyolefin-based foamed sheets are preferable, and polypropylene foamed sheets are especially preferable. When a polypropylene foamed sheet is used, the elongation of the fixing member and the loss tangent tan δ of the base material at 85° C. are easily reduced. In addition, the heat resistance is improved.

In the case of foamed sheets, the loss tangent and the elongation tend to increase when the expansion ratio or the cell diameter is increased. Thus, the foamed sheet is preferably a foamed sheet having a low expansion ratio and a small cell diameter. For reducing the cell diameter, the crosslinking degree of the foamed sheet is preferably large. The foamed sheet having a small cell diameter is preferably a polyolefin-based foamed sheet.

In the present embodiment, the pressure-sensitive adhesive that forms the pressure-sensitive adhesive layer is not particularly limited, and examples thereof include acryl-based pressure-sensitive adhesives, urethane-based pressure-sensitive adhesives, rubber-based pressure-sensitive adhesives and silicone-based pressure-sensitive adhesives. Of these, acryl-based pressure-sensitive adhesives are preferable from the viewpoint of easily reducing the elongation while securing certain adhesive strength. Hereinafter, specific examples of the pressure-sensitive adhesive will be described in more detail where the pressure-sensitive adhesive that forms the pressure-sensitive adhesive layer is an acryl-based pressure-sensitive adhesive.

The acryl-based pressure-sensitive adhesive comprises an acryl-based polymer. The acryl-based polymer is one obtained by polymerizing monomer components including at least an acryl-based monomer. The acryl-based polymer is preferably a polymer having a polar group. The polar group is a functional group which has active hydrogen, and is preferably capable of reacting with crosslinkers described later, and specific examples thereof include carboxy groups, hydroxyl groups and amino groups. Of these functional groups, a hydroxyl group is preferable. The hydroxyl group has high reactivity with isocyanate-based crosslinkers described later, etc., and can easily form a crosslinked structure.

Specific examples of the acryl-based polymer include copolymers of a (meth)acrylic acid alkyl ester monomer (A1) and a polar group-containing monomer (A2), and copolymers of the monomers (A1) and (A2) and a monomer (A3) other than the monomers (A1) and (A2). Of these, copolymers of a (meth)acrylic acid alkyl ester monomer (A1) and a polar group-containing monomer (A2) are preferable.

The term "(meth)acrylic acid" is used as a term which means one of acrylic acid and methacrylic acid or both, and the same applies to other similar terms.

The (meth)acrylic acid alkyl ester monomer (A1) is not particularly limited, and examples thereof include methyl (meth)acrylate, ethyl (meth)acrylate, propyl (meth)acrylate, n-butyl (meth)acrylate, tert-butyl (meth)acrylate, 2-ethylhexyl (meth)acrylate, n-octyl (meth)acrylate, isooctyl (meth)acrylate, isononyl (meth)acrylate, isomyristyl (meth)acrylate and stearyl (meth)acrylate. One monomer (A1) may be used, or two or more may be used in combination.

Preferably, the alkyl-based polymer comprises a (meth)acrylic acid alkyl ester monomer (A1) as a main monomer. The phrase " . . . comprises . . . as a main monomer" means that the content thereof is 50 mass % or more based on the total amount of monomer components forming the alkyl-based polymer, and the content of the monomer (A1) is preferably 70 mass % or more. The content of the (meth)acrylic acid alkyl ester monomer (A1) is preferably 99 mass % or less, more preferably 97 mass % or less, based on the total amount of the monomer components.

Among the monomers (A1), (meth)acrylic acid alkyl ester monomers (A1) with the alkyl group having 1 to 12 carbon atoms, and acrylic acid alkyl ester monomers (A1) with the alkyl group having 2 to 8 carbon atoms are more preferably contained. The acrylic acid alkyl ester monomer (A1) with the alkyl group having 2 to 8 carbon atoms may be a main monomer, and therefore the content of the acrylic acid alkyl ester monomer (A1) with the alkyl group having 2 to 8 carbon atoms is preferably 50 mass % or more, more preferably 70 mass % or more, and preferably 99 mass % or less, more preferably 97 mass % or less, based on the total amount of monomer components forming the acryl-based polymer.

Examples of the polar group-containing monomer (A2) having a hydroxyl group include hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 5-hydroxypentyl (meth)acrylate and 6-hydroxyhexyl (meth)acrylate.

Examples of the polar group-containing monomer (A2) comprising a carboxy group include acrylic acid, methacrylic acid and crotonic acid.

One polar group-containing monomer (A2) may be used, or two or more may be used in combination.

The content of the polar group-containing monomer (A2) in the monomer components forming the acryl-based polymer is, for example, 1 to 30 parts by mass, preferably 2 to 20 parts by mass, based on 100 parts by mass of the (meth)acrylic acid alkyl ester monomer (A1). When the amount of the polar group-containing monomer (A2) used is within the above-described range, crosslinking reaction of the polar group with the crosslinker easily proceeds appropriately.

Examples of the other monomer (A3) include acryl-based monomers such as cyclohexyl (meth)acrylate, isobornyl (meth)acrylate, benzyl (meth)acrylate, 2-butoxyethyl (meth)acrylate, glycidyl (meth)acrylate, tetrahydrofurfuryl (meth)acrylate, N,N-dimethylacrylamide, N,N-diethylacrylamide, N-isopropylacrylamide and acrylamide. Examples of the other monomer include N-vinylpyrrolidone, N-vinyl caprolactam, N-vinyl acetamide, N-acryloyl morpholine, styrene and vinyl acetate. One other monomer (A3) may be used, or two or more may be used in combination.

The acryl-based polymer (A) is a main component of the acryl-based pressure-sensitive adhesive, and is normally 50 mass % or more, preferably 55 to 98 mass %, more preferably 60 to 95 mass %, based on the total amount of acryl-based pressure-sensitive adhesive (based on nonvolatile components).

The method for polymerizing the acryl-based polymer is not particularly limited, and can be obtained by performing polymerization through free radical polymerization or living radical polymerization. Examples of the polymerization method include solution polymerization (polymerization at boiling point or polymerization at constant temperature), emulsion polymerization, suspension polymerization and bulk polymerization.

Of these, living radical polymerization is preferable. When living radical polymerization is used, low-molecular-weight components can be suppressed to keep the dispersion degree low. Thus, the elongation of the fixing member is easily reduced.

The molecular weight distribution (Mw/Mn) of the acryl-based polymer is, for example, 1.05 to 8, preferably 1.05 to 2.5, still more preferably 1.1 to 2. When the molecular weight distribution is 2.5 or less, the amount of the low-molecular-weight components of the acryl-based polymer decreases, so that a decrease in adhesive strength of the fixing member and an increase in elongation of the fixing member can be prevented. The molecular weight distribution (Mw/Mn) is a ratio of the weight average molecular weight to the number average molecular weight (Mn).

The weight average molecular weight (Mw) of the acryl-based polymer is preferably 50,000 or more and 2,000,000 or less, more preferably 100,000 or more and 1,000,000 or less.

The weight average molecular weight (Mw) and the number average molecular weight (Mn) are measured in terms of a molecular weight of polystyrene by a gel permeation chromatography (GPC) method. Specifically, a diluted solution obtained by diluting the acryl-based polymer by 50 times with tetrahydrofuran (THF) is filtered with a filter, and using the obtained filtrate, the weight average molecular weight (Mw) and the number average molecular weight (Mn) are measured in terms of a molecular weight of polystyrene by a GPC method. In the GPC method, for example, 2690 Separations Model (Waters Corporation) or the like can be used.

It is preferable that the acryl-based pressure-sensitive adhesive further comprise a tackifier resin. When the acryl-based pressure-sensitive adhesive comprises the tackifier, the adhesion of the fixing member is improved. Examples of the tackifier resin include rosin resins, disproportionated rosin resins, polymerized rosin resins, hydrogenated rosin resins, rosin-modified phenol resins, rosin ester resins, disproportionated rosin ester resins, polymerized rosin ester resins, hydrogenated rosin ester resins, terpene resins, terpen phenol resins, coumarone-indene resins and petroleum-based resins.

The content of the tackifier resin is preferably 5 to 70 parts by mass, more preferably 10 to 40 parts by mass, based on 100 parts by mass of the acryl-based polymer.

Preferably, the acryl-based pressure-sensitive adhesive further comprises a crosslinker, and the pressure-sensitive adhesive layer of the fixing member 15 is crosslinked by the crosslinker. The crosslinker is not particularly limited, and examples thereof include isocyanate-based crosslinkers, aziridine-based crosslinkers, epoxy-based crosslinkers and metal chelate-type crosslinkers. Of these, isocyanate-based crosslinkers are preferable because they are excellent in adhesion stability to the base material.

The content of the crosslinker in the acryl-based pressure-sensitive adhesive may be appropriately set according to the type of pressure-sensitive adhesive, and is, for example, preferably 0.5 to 20 parts by mass, more preferably 1 to 15 parts by mass, based on 100 parts by mass of the total of the acryl-based polymer (A) and the tackifier resin. When the content of the crosslinker is within the above-mentioned range, the above-described elongation of the fixing member 15 is easily adjusted to be within a predetermined range while the adhesion is improved.

It is preferable that the pressure-sensitive adhesive layer be crosslinked by a crosslinker as described above. One of indices of the crosslinking degree of the pressure-sensitive adhesive layer is a gel fraction. The gel fraction of the pressure-sensitive adhesive layer is, for example, 30 to 65 mass %, preferably 35 to 55 mass %, more preferably 40 to 50 mass %. When the gel fraction is within the above-described range, it is possible to secure the adhesion while securing the cohesive force of the pressure-sensitive adhesive layer to suppress the above-described elongation in the thickness direction.

The gel fraction can be determined by immersing a test piece made of a pressure-sensitive adhesive layer in ethyl acetate at 23° C. for 24 hours, measuring undissolved contents, and performing calculation in accordance with the following expression.

Gel fraction (mass %)=(B/A)×100

A: Mass of test piece
B: Mass of undissolved contents after drying

In the present invention, the acryl-based pressure-sensitive adhesive may further comprise a coupling agent. When the acryl-based pressure-sensitive adhesive comprises the coupling agent, the adhesive strength, in particular, the adhesive strength to a metal (e.g. a terminal) is easily improved. Examples of the coupling agent include silane coupling agents, titanate-based coupling agents and zirconate-based coupling agents. Of these, silane coupling agents are preferable because they have an excellent effect of improving bondability. One coupling agent may be used, or two or more may be used in combination.

The content of the coupling agent is preferably 0.1 to 10 parts by mass, more preferably 0.5 to 5 parts by mass, based on 100 parts by mass of the acryl-based polymer. When the content of the coupling agent is within the above-described range, the bonding strength to an adherend can be appropriately improved.

The acryl-based pressure-sensitive adhesive may further comprise other additives such as a plasticizer, an emulsion, a softener, a filler, a pigment and a dye if necessary.

When the acryl-based pressure-sensitive adhesive is used, the elongation of the fixing member in a direction along the thickness direction Z can be appropriately adjusted by adjusting, for example, the dispersion degree of the acryl-based polymer, the composition of monomer components forming the acryl-based polymer, the gel fraction of the pressure-sensitive adhesive layer and the type of crosslinker. For example, when the dispersion degree of the acryl-based polymer is reduced, the above-described elongation tends to decrease. When the acrylic acid alkyl ester monomer (A1) with the alkyl group having 2 to 8 carbon atoms is used as the monomer component forming the acryl-based polymer, reduction of the number of carbon atoms in the alkyl group hardens the acryl-based polymer, so that the elongation is easily reduced. Increasing of the number of carbon atoms in the alkyl group softens the alkyl-based polymer, so that the elongation is easily increased. For example, when the gel fraction of the pressure-sensitive adhesive layer is within the above-described desired range, the elongation is easily suppressed. Of course, the factor of adjusting the elongation is not limited to those mentioned above, and the elongation can be appropriately adjusted by the type or thickness of the base material, the thickness of the pressure-sensitive adhesive, or the like.

(Joining Member)

The joining member 18 is a planar sheet-shaped member as shown in FIGS. 1 and 3, and is composed of, for example, a resin sheet. The resin sheet is not particularly limited as long as it has certain strength which enables the conductive member 11 and the fixing member 15 to be supported. For the resin sheet, a resin sheet having flexibility may be used. The electric connection member 10 is integrated by the joining member 18 to be easily sandwiched between the terminal and the connection target member. Since the conductive member 11 and the fixing member 15 are positioned at regular intervals, application of pressure to the conductive member 11 is likely to be uniform.

In the joining member 18, a through-hole 18A is formed. The conductive member 11 is inserted and fixed inside the through hole 18A. A plurality of through-holes 18A corresponding to a plurality of conductive members 11 are provided. The shape of the through-hole 18A may be adjusted to fit the shapes of the insulating portion 13 and the conductive member 11, and is a circular shape or a polygonal shape such as a quadrangular shape, preferably a circular shape. A portion forming the outer periphery of the through-hole 18A is an edge portion 18B. The edge portion 18B is disposed so as to be embedded in each conductive member 11 (e.g. insulating portion 13), whereby the conductive member 11 is fixed to the joining member 18.

The diameter of the through-hole 18A is not particularly limited, and is, for example, 0.5 to 8 mm, preferably 1 to 4 mm. The diameter of the through-hole 18A is selected to be in the range of preferably 50 to 200%, more preferably 60 to 150% of the diameter of the conductive portion 12.

As the resin sheet that forms the joining member 18, for example, polyethylene terephthalate (PET) sheets, polyethylene naphthalate sheets, polycarbonate sheets, polyether ether ketone sheets, polyimide sheets, polyamide sheets, polyethylene sheets, polypropylene sheets and polyurethane sheets are used. Of these, PET sheets and polyimide sheets are preferable from the viewpoint of durability, heat resistance and the like.

The thickness of the joining member 18 (resin sheet) is not particularly limited, and is, for example, 30 to 1000 μm, preferably 50 to 350 μm.

The joining member 18 may be provided with a through-hole 19 having a small diameter in addition to the through-hole 18A. By the through-hole 19, air is allowed to pass between the inner peripheral side of the fixing member 15 and the outside, and the electric connection member 10 is easily fixed to the mounting member and the terminal. In addition, it is possible to avoid problems such as peeling of the fixing member 15 and poor conduction of the conductive member 11, which are caused by air inflation of the surrounded space. In addition, the through-hole 19 can be used as a positioning hole which is used in the operation of fixing the conductive member 11 in the through-hole 18A, or the operation of forming the fixing member 15.

<Production Method>

Hereinafter, a method for producing the electric connection sheet 10 according to the present embodiment will be described. In this production method, first, a mold is prepared. The mold comprises an upper mold and a lower mold each made of a nonmagnetic material such as aluminum or copper. In each of the upper mold and the lower mold, a pin made of a ferromagnetic material such as iron or a magnet is embedded at a position corresponding to the conductive member 12. One end of the pin is exposed to the cavity surfaces of the upper mold and the lower mold.

A resin sheet for forming the joining member 18, and the like are prepared. As the resin sheet, one having a plurality of through-holes 18A formed by performing punching or the like may be prepared. The resin sheet is inserted into the mold in which the pin is embedded, and a liquid rubber as a raw material for the conductive member 11, a molten thermoplastic elastomer, and the like are injected into the cavity. A magnetic conductive filler is mixed with the liquid rubber in advance.

Next, a magnetic field is applied from above and below the mold using a magnet. In the cavity, a parallel magnetic field for connecting the pins is formed, and the conductive filler in the liquid rubber and the like is continuously arrayed in a magnetic line direction. After the arraying, the upper and lower molds are thoroughly tightened together, heating treatment is performed to cure the liquid rubber, and resultantly, a sheet-shaped molded product is obtained in which the conductive member 11 is integrated with the resin sheet forming the joining member 18. Thereafter, the fixing member is mounted on the sheet-shaped molded product by a known method to obtain an electric connection sheet. An example has been described above in which the conductive filler is arrayed, but it is not required to array the conductive filler, and in this case, the step of arraying the conductive filler may be omitted.

Second Embodiment

Figure 4:
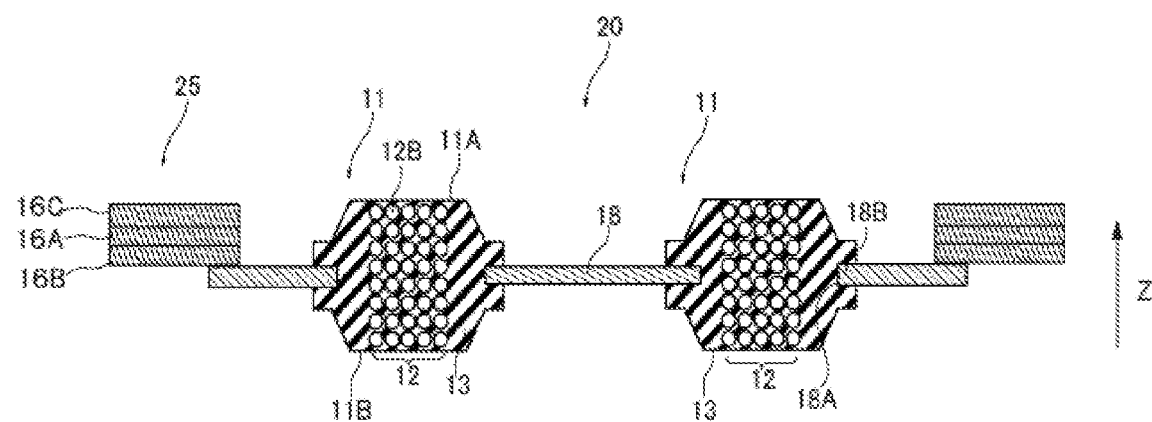
FIG. 4 is a sectional view of an electric connection member according to a second embodiment.

Next, a second embodiment of the present invention will be described in more detail with reference to FIG. 4. The second embodiment is different from the first embodiment only in the configuration of the fixing member. Hereinafter, only aspects in which the second embodiment is different from the first embodiment are described, and descriptions of members having the same configuration as in the first embodiment are omitted.

In the first embodiment, the fixing member is provided on each of both surfaces of the joining member 18, but in an electric connection member 20 according to the present embodiment, a fixing member 25 is provided only one surface of the joining member 18. However, in the present embodiment, both surfaces of the electric connection member 20 are also bonded to another member by the fixing member 25. Thus, the fixing member 25 is disposed so as to protrude from the joining member 18, a part of one pressure-sensitive adhesive layer 16B is bonded to the joining member 18, and the other part is not bonded to the joining member 18, and is disposed so as to protrude from the joining member 18, and exposed. This enables one surface side of the electric connection member 20 (lower surface in FIG. 4) to be bonded to another member by one pressure-sensitive adhesive layer 16B. The other surface side of the electric connection member 20 (upper surface in FIG. 4) can also be bonded to another member by the other pressure-sensitive adhesive layer 16C.

In the present embodiment, the fixing member 25 has the same configuration as that of the above-described fixing members 15A and 15B, and descriptions of other aspects of the present embodiment are omitted.

In the present embodiment, as described above, at least one of the first and second compressive stresses of the conductive member 11 is within the above-described predetermined range, and the fixing member 25 has an elongation of 400 μm or less when drawn at 96 kPa for 30 minutes in a direction along the thickness direction. Therefore, even long-term use is less likely to cause a problem of peeling of the electric connection member 10 from the connection target member, and increased electric resistance leading to occurrence of temperature rise.

Third Embodiment

Figure 5:
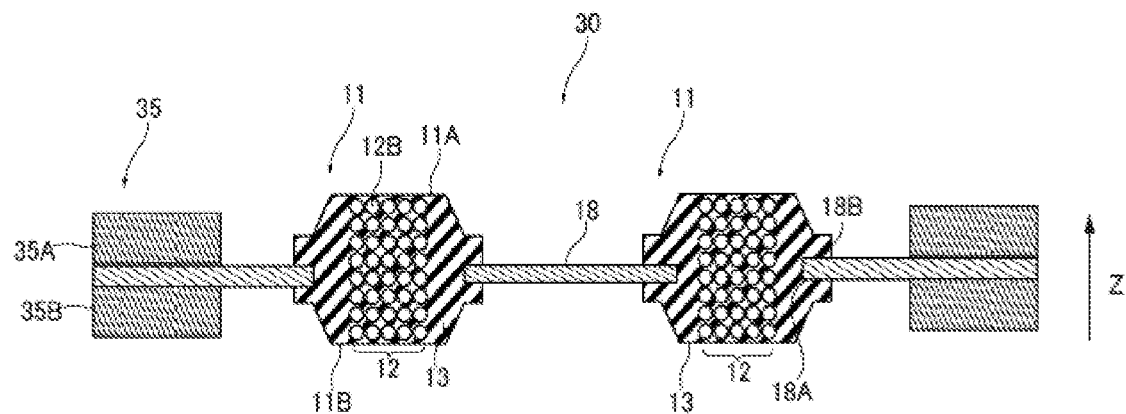
FIG. 5 is a sectional view of an electric connection member according to a third embodiment.

Next, a third embodiment of the present invention will be described in more detail with reference to FIG. 5. The third embodiment is different from the first embodiment only in the configuration of the fixing member. Hereinafter, only aspects in which the third embodiment is different from the first embodiment are described, and descriptions of members having the same configuration as in the first embodiment are omitted.

In the first, embodiment, the fixing members 15A and 15B provided on both surfaces of the joining member 18 are double sided pressure-sensitive adhesive tapes having a base material, but each of fixing members 35A and 35B consists of a pressure-sensitive adhesive layer in the present embodiment.

In an electric connection member 30 according to the present embodiment, each of the fixing members 35A and 35B consists of a pressure-sensitive adhesive layer, and has the same elongation as described above when drawn at 96 kPa for 30 minutes in a direction along the thickness direction. The pressure-sensitive adhesive layer according to the third embodiment may be the same as the pressure-sensitive adhesive layer in the first embodiment. For the elongation of the pressure-sensitive adhesive layer alone to fall within the above-described elongation range, the configuration of the pressure-sensitive adhesive may be appropriately adjusted as described in the first embodiment. The conductive member 11 is the same as in the first embodiment. Therefore, as in the first embodiment, even long-term use is less likely to cause a problem of peeling of the electric connection member 30 from the connection target member, and increased electric resistance leading to occurrence of temperature rise.

Fourth Embodiment

Figure 6:
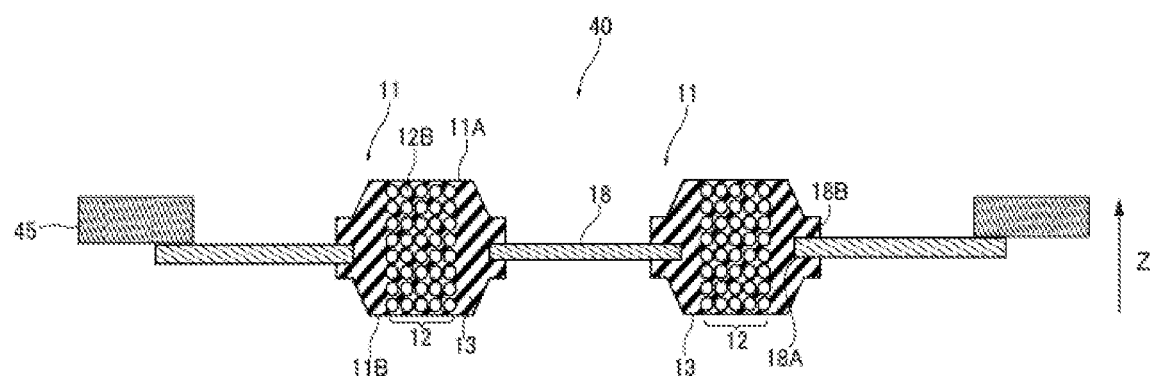
FIG. 6 is a sectional view of an electric connection member according to a fourth embodiment.

Next, a fourth embodiment of the present invention will be described in more detail with reference to FIG. 6. The fourth embodiment is different from the second embodiment only in the configuration of the fixing member. Hereinafter, only aspects in which the fourth embodiment is different from the second embodiment are described, and descriptions of members having the same configuration as in the second embodiment are omitted. In the second embodiment, the fixing member is a double sided pressure-sensitive adhesive tape having a base material, but in an electric connection member 40 according to the present embodiment, a fixing member 45 consists of a pressure-sensitive adhesive layer.

The fixing member 45 in the present embodiment consists of a pressure-sensitive adhesive layer, and has the same elongation as described above when drawn at 96 kPa for 30 minutes in a direction along the thickness direction. The pressure sensitive adhesive layer may be the same as the pressure-sensitive adhesive layer in each of the above-described embodiments, but for the elongation of the pressure-sensitive adhesive layer alone to fall within the above-described elongation range, the configuration of the pressure-sensitive adhesive may be appropriately adjusted as described above. The conductive member 11 is the same as in the first embodiment. Therefore, as in the first embodiment, even long-term use is less likely to cause a problem of peeling of the electric connection member 40 from the connection target member, and increased electric resistance leading to occurrence of temperature rise.

[Modification of Conductive Member]

The electric connection member of the present invention has been described above by way of the embodiments, but the electric connection member of the present invention is not limited to those described above, and various modifications can be made.

For example, in each of the embodiments described above, an example has been described in which the conductive member 11 comprises the conductive portion 12 and the insulating portion 13, and the conductive portion 12 forms only a part of the conductive member, but the conductive member is not limited to the example described above. For example, the entire conductive member may be formed from a conductive rubbery elastomer. That is, the entire conductive member 11 may be the conductive portion 12 with the conductive filler dispersed in the entire conductive member. As the conductive filler, carbon fillers of conductive carbon black, carbon fiber and graphite, metal fillers or alloy fillers of silver, copper, nickel, gold, tin, zinc, platinum, palladium, iron, tungsten, molybdenum, solder and the like, and conductive fillers prepared by covering the surfaces of particles of these metals with conductive coatings of metals or the like can be used. As the conductive filler, for example, conductive fillers obtained by applying conductive coatings of metals or the like to the surfaces of polymer particles being nonconductive particles composed of polyethylene, polystyrene, phenol resin, epoxy resin, acrylic resin or benzoguanamine resin, or inorganic particles composed of glass beads, silica, graphite or ceramic can also be used. Examples of the shape of the conductive filler include a granular shape, a fibrous shape, a strip shape and a wire shape. One conductive filler may be used, or two or more may be used in combination. In this case, the diameter of the conductive member is equal to the diameter of the conductive portion.

When the entire conductive member is formed from the conductive rubbery elastomer, the filling factor of the conductive filler in the rubbery elastomer forming the conductive member is preferably in the range of 25 to 90 vol %, more preferably in the range of 30 to 85 vol %, still more preferably in the range of 35 to 80 vol %. In the present embodiment, the conductive filler may be arrayed in the thickness direction, or is not required to be arrayed in the thickness direction.

When the conductive filler is dispersed in the entire conductive member, the first and second compressive stresses are likely to be relatively large at a filling factor in the above-described range, but even when the first and second compressive stresses increase, use of the fixing member in each of the above-described embodiments enables the conductive member to be appropriately held in a state of compression.

Further, the conductive member has a smaller diameter at both the upper surface and the lower surface than at a portion therebetween in each of the above-described embodiments, but may have a smaller diameter at only one of the upper surface and the lower surface than at a portion therebetween. The conductive member is not required to have a smaller diameter at both the upper surface and the lower surface than at a portion therebetween.

Examples of the conductive member include rubbery elastomer having metal wires arranged therein, rubbery elastomer covered externally with a thin conductive layer composed of a metal foil, a metal fabric, a conductive rubbery elastomer or the like, and metal spring, in addition to conductive rubbery elastomer.

The conductive member having metal wires arranged in a rubbery elastomer is one in which a plurality of metal wires are arranged along the thickness direction Z. Examples of the metal that forms the metal wire include metals having conductivity, such as gold, silver, platinum, aluminum, copper, iron, nickel, palladium, chromium and stainless steel, and alloys thereof. The diameter of the metal wire is preferably 0.01 to 0.2 mm, more preferably 0.02 to 0.1 mm, from the viewpoint of having moderate elasticity and suitable conductivity.

The conductive member having a rubbery elastomer covered externally with a thin conductive layer of a metal foil, a metal fabric, a conductive rubbery elastomer or the like is one in which a thin layer composed of a metal foil or a metal fabric of a metal having conductivity, such as gold, silver, platinum, aluminum, copper, iron, nickel, palladium, chromium or stainless steel, or an alloy thereof or a conductive rubbery elastomer is wound around or applied to a rubbery elastomer along the thickness direction Z of the conductive member to cover the rubbery elastomer. The thickness of the conductive layer composed of a metal foil, a metal fabric, a conductive rubbery elastomer or the like is preferably 0.001 to 0.5 mm from the viewpoint of having moderate elasticity and suitable conductivity.

The conductive member being a metal spring is formed from a metal having conductivity, such as gold, silver, platinum, aluminum, copper, iron, nickel, palladium, chromium or stainless steel, or an alloy thereof. Examples of the metal spring include coil springs, flat springs and plate springs.

[Modifications of Arrangement of Conductive Member]

Figure 7:
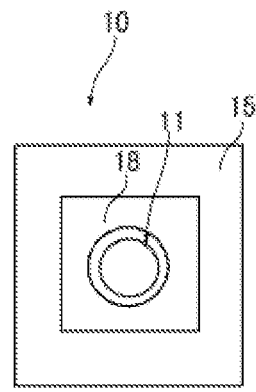
FIG. 7 is a plan view showing an example of arrangement of conductive members.
Figure 8:
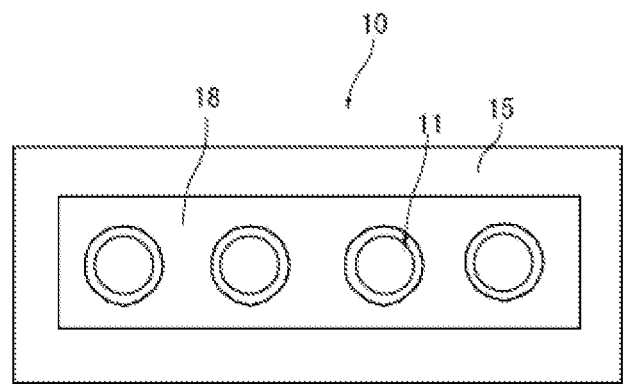
FIG. 8 is a plan view showing an example of arrangement of conductive members.
Figure 9:
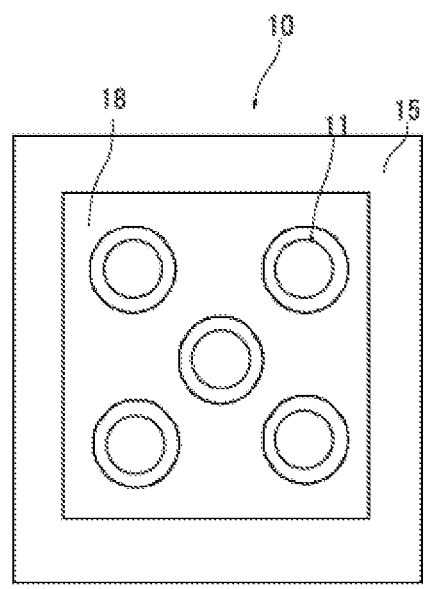
FIG. 9 is a plan view showing an example of arrangement of conductive members.

In each of the above-described embodiments, the number and the arrangement of conductive members are not limited to the arrangement shown in FIG. 3, and various numbers and arrangements can be adopted. FIGS. 7 to 9 show specific examples thereof. FIGS. 7 to 9 show typical modifications of the electric connection member according to the first embodiment, but the numbers and the arrangements of the conductive members described below can be applied to any embodiment.

Figure 2:
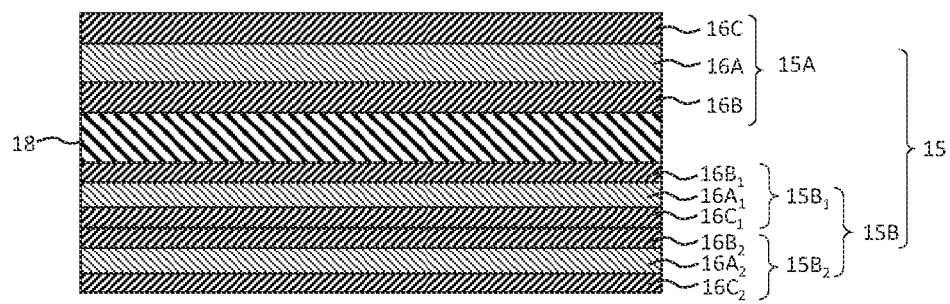
FIG. 2 is a sectional view showing an example of a fixing member of the electric connection member according to the first embodiment.
Figure 2:
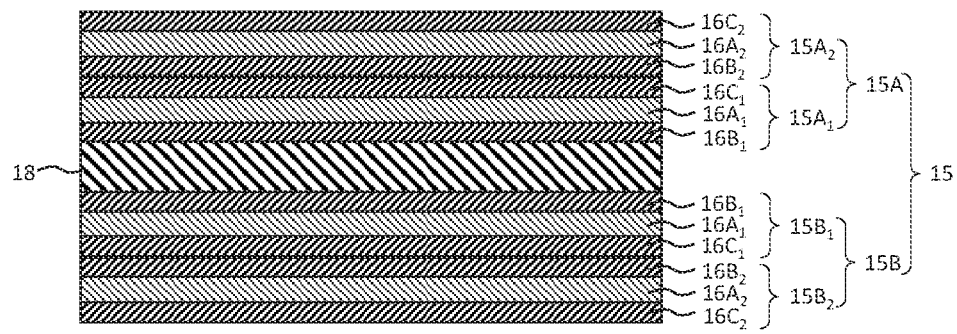

The number of conductive members 11 in the electric connection member 10 may be one as shown in FIG. 7, or 2 or more, and is preferably 2 or more from the viewpoint of suppressing temperature rise in the conductive member 11 due to electric resistance. The number of conductive members 11 is not particularly limited, and is, for example, 20 or less, preferably 10 or less, from the viewpoint of productivity.

For the arrangement of a plurality of conductive members 11, it is not necessary that a plurality of conductive members in one row be provided in a plurality of rows as shown in FIG. 3, and a plurality of conductive members 11 may be in one row as shown in FIG. 8. When conductive members 11 arranged laterally in one row are provided longitudinally in a plurality of rows as shown in FIG. 9, the numbers of conductive members 11 in the rows are not required to be the same, and may be different. In this case, the number of conductive members 11 in each row may be 1, and the conductive members in the rows are not required to be at the same position in a lateral direction. As shown in, for example, FIG. 9, the arrangement may consist of a row of two conductive members 11, a row of one conductive member and a row of two conductive members 11.

Of course, the arrangement of conductive members 11 is not limited to those described above, and may be any arrangement as long as the effects of the present invention are exhibited.

[Outer Sheet Member]

The electric connection member may have an outer sheet member outside a joining member. Hereinafter, a modification in which an outer sheet member is provided in the first embodiment will be described with reference to FIG. 10, and the outer sheet member may be provided in other embodiments.

Figure 10:
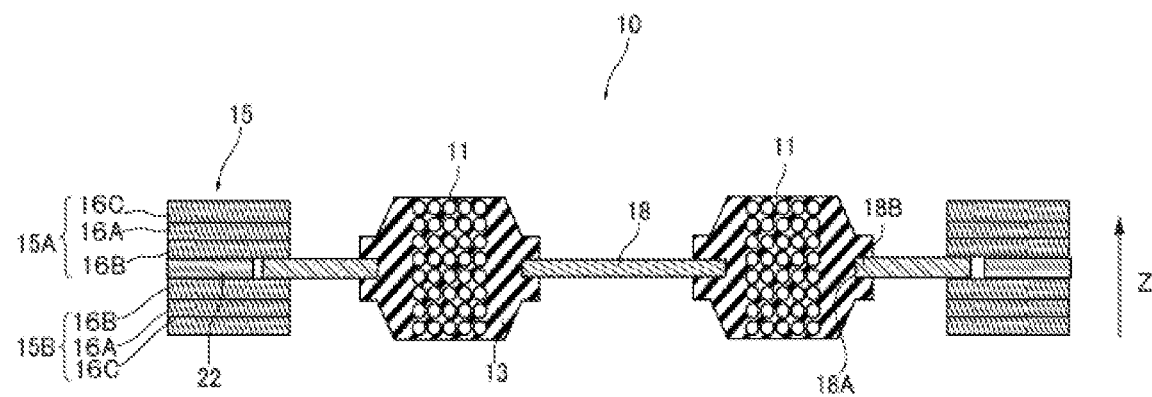
FIG. 10 is a sectional view showing a modification of the electric connection member.

That is, in the present modification, an outer sheet member 22 is provided outside a sheet-shaped joining member 18 as shown in FIG. 10. A double sided pressure-sensitive adhesive tape forming a fixing member 15A is disposed so as to extend over an outer peripheral portion of the joining member 18 and the outer sheet member 22, and one pressure sensitive adhesive layer 16B of the fixing member 15A is bonded to an outer peripheral portion of one surface (upper surface) of the joining member 18 and one surface (upper surface) of the outer sheet member 22. Similarly, a double sided pressure-sensitive adhesive tape forming a fixing member 15B is disposed so as to extend over the outer peripheral portion of the joining member 18 and the outer sheet member 22, and one pressure-sensitive adhesive layer 16B of the fixing member 15B is bonded to an outer peripheral portion of the other surface (lower surface) of the joining member 18 and the other surface (lower surface) of the outer sheet member 22. In this way, the fixing members 15A and 15B are supported not only by the outer peripheral portion of the joining member 18 but also by the outer sheet member 22.

The outer sheet member 22 is normally composed of a resin sheet. As the resin sheet, one similar to a resin sheet usable for the joining member can be used. The resin sheet of the joining member 18 and the resin sheet of the outer sheet member 22 may be formed from the same material or formed from different materials. The outer sheet member 22 may have a shape corresponding to the shapes of the fixing members 15 (fixing members 15A and 15B). In the present modification, the fixing members 15A and 15B are formed in a frame shape as in the first embodiment, and therefore the outer sheet member 22 may also have a frame shape formed so as to surround the joining member 18.

[Modifications of Fixing Member]

In each of the above-described embodiments, and the modifications, the fixing member has a frame shape surrounding the conductive member 11 provided in the joining member 18, but the shape of the fixing member is not limited to a frame shape. However, it is preferable that the fixing member be disposed outside the conductive member 11.

Figure 11:
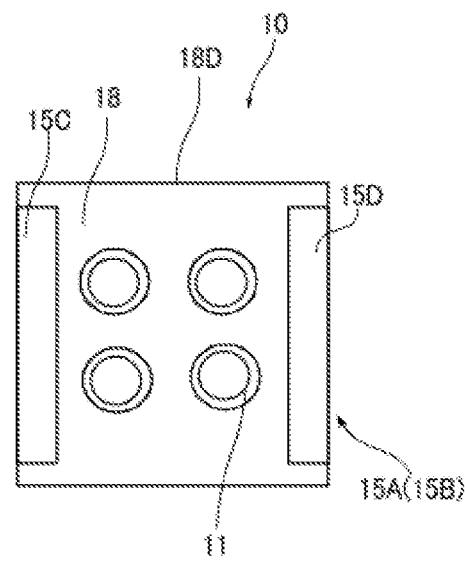
FIG. 11 is a plan view showing a modification of the fixing member.
Figure 12:
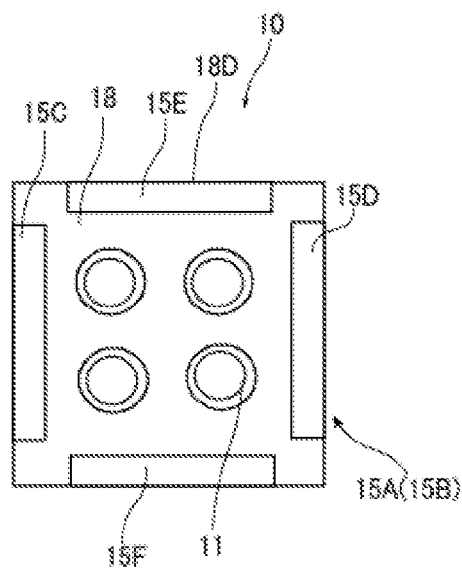
FIG. 12 is a plan view showing a modification of the fixing member.

For example, the fixing members 15A and 15B provided on surfaces of the joining member 18 may be each composed of first and second fixing members 15C and 15D disposed so as to sandwich the conductive portion 12 as shown in FIG. 11. In addition to the first and second fixing members 15C and 15D, third and fourth fixing members 15E and 15F may be provided so as to surround the conductive portion 12 on all sides as shown in FIG. 12.

A plurality of conductive portions may be surrounded by five or more fixing members. Further, a narrow communicating channel or groove connecting the inside of the frame to the outside of the frame may be provided in the above-described frame-shaped fixing member to ensure that the fixing member cannot be bonded on the entire periphery.

The phrase "the fixing member is disposed outside the conductive member 11" means that at least one fixing member is provided closer to any position on an outer periphery 18D of the joining member 18 (see FIGS. 11 and 12) than to each conductive member 11. Thus, at least one fixing member may be disposed between any conductive member 11 and the outer periphery 18D. However, it is preferable that each conductive member 11 be sandwiched between the fixing members on at least two opposite sides as shown in FIGS. 3, 11 and 12.

Figure 13:
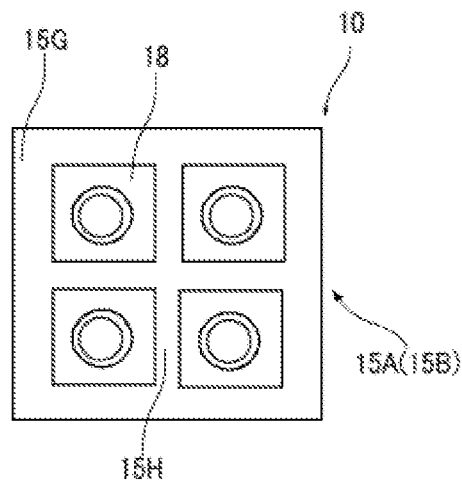
FIG. 13 is a plan view showing a modification of the fixing member.

The fixing member may be partly provided between a plurality of conductive members 11. For example, as shown in FIG. 13, the fixing member may be a combination of a frame portion 15G surrounding the outside of a plurality of conductive members 11 with a connection portion 15H disposed between the conductive members 11 and connecting inner peripheral portions of the frame portion 15G.

In any of the cases described above, each fixing member may be provided on each of both surfaces of the joining member as in the first and third embodiments, or provided on one surface of the joining member as in the second and fourth embodiments. Further, each fixing member may be a double sided pressure-sensitive adhesive tape comprising a base material and a pressure-sensitive adhesive layer on each of both surfaces of the base material as in the first and second embodiments, or may consists of a pressure-sensitive adhesive layer as described in the third and fourth embodiments.

In the electric connection member, the joining member may be omitted. When the joining member is omitted, for example, the fixing member may be directly bonded to the conductive member.

[Terminal-Equipped Glass Plate Structure]

Figure 14:
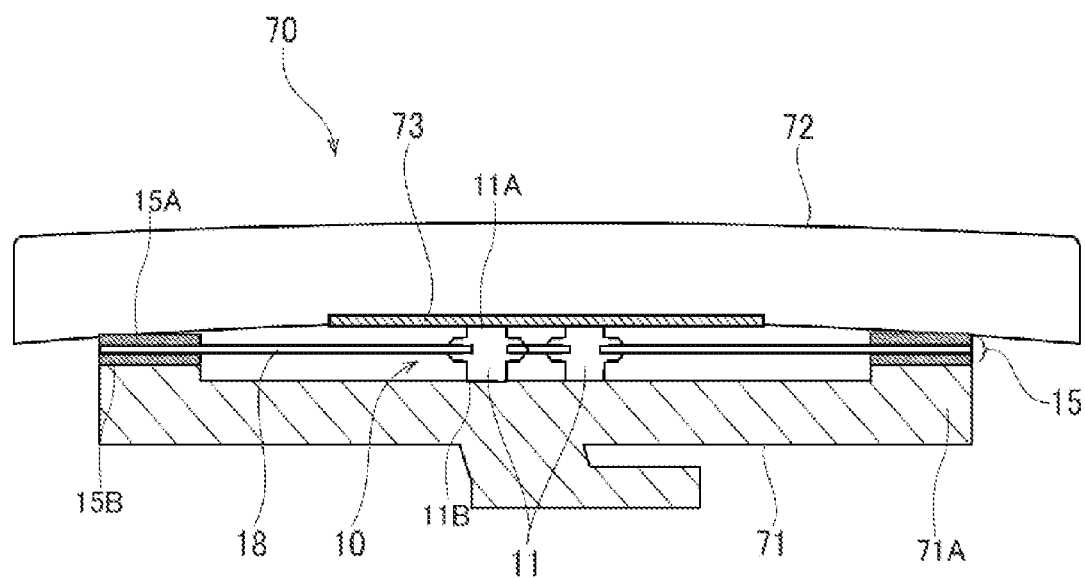
FIG. 14 is a sectional view showing a terminal-equipped glass plate structure.

For example, the electric connection member of the present invention is used for electrically connecting a terminal to a conductive layer being a connection target member, and fixing the terminal to a glass plate (mounted member) having a conductive layer. FIG. 14 shows a terminal-equipped glass plate structure 70 in which a terminal 71 is fixed to a glass plate 72 by the electric connection member 10 according to the first embodiment. Hereinafter, the terminal-equipped glass plate structure 70 will be described in more detail.

The terminal-equipped glass plate structure 70 comprises the electric connection member 10, the glass plate 72 and the terminal 71. The glass plate 72 has a conductive layer 73 provided on one surface thereof. The terminal 71 is mounted on a surface of the glass plate 72 which is provided with the conductive layer 73.

The material of the conductive layer 73 is not particularly limited, and may be a metal having conductivity, such as gold, silver, platinum, aluminum, copper, iron, palladium, chromium or stainless steel. The material of the terminal 71 is not particularly limited, and similarly may be a metal having conductivity, such as gold, silver, platinum, aluminum, copper, iron, palladium, chromium or stainless steel.

In the terminal-equipped glass plate structure 70, the electric connection member 10 is disposed between the terminal 71 and the conductive layer 73. Here, both end surfaces of each conductive portion 12 of the electric connection member 10 (i.e. upper surface 11A and lower surface 11B of conductive member 11) each come into contact with each of the conductive layer 73 and the terminal 71. Thus, the terminal 71 is connected to the conductive layer 73 through a plurality of conductive portions 12.

In the electric connection member 10, one fixing member 15A is bonded to the glass plate 72 and the other fixing member 15B is bonded to the terminal 71 to fix the terminal 71 to the glass plate 72. However, the fixing member 15B may be bonded to the glass plate 72, and also to the conductive layer 73.

Here, each conductive member 11 comes into contact with the terminal 71 and the conductive layer 73 in a state of compression. When compressed, each conductive member 11 has increased conductivity, and is applied to the terminal 71 and the conductive layer 73 by repulsion, so that the conductive member 11 can be more reliably connected to the terminal 71 and the conductive layer 73. When the conductive member 11 is applied by repulsion, the terminal 71 is likely to peel from the glass plate 72, but in the terminal-equipped glass plate structure 70, the peeling is less likely to occur because the terminal 71 is reliably fixed to the glass plate 72 by the fixing member 15.

Each conductive member 11 may be compressed by, for example, 5 to 40%, preferably 10 to 30%, more preferably 15 to 30%.

A surface of the terminal 71 which is in contact with a plurality of conductive members 11 may have a planar shape. When the surface has a planar shape, a plurality of conductive members 11 are easily compressed equally.

In the configuration in FIG. 14, the thickness from the joining member 18 to the lower surface 11B of the conductive member 11 is larger than the thickness of the fixing member 15B. Thus, in the terminal 71, an outer peripheral portion 71A to be bonded to the fixing member 15A is higher than other portions, but the outer peripheral portion 71A is not necessarily required to be high, and a surface of the terminal 71 which is opposed to the glass plate 72 may entirely have a planar shape.

The glass plate 72 is not particularly limited, and is preferably an automotive windowpane. The automotive windowpane may be provided with electric heating wires for a defroster and a defogger. The glass plate 72 provided with electric heating wires is normally provided with the conductive layer 73 to which electric heating wires are collectively connected. The terminal 71 is connected to the conductive layer 73 through the conductive member 11, and thus, an electric current is applied to the electric heating wires through the terminal 71, the conductive member 11 and the conductive layer 73.

The electric heating wires provided on the automotive windowpane consume a large amount of electric power, and needs application of a large amount of electric current, and in the electric connection member 10 of the present invention, temperature rise is suppressed even when a large amount of electric current is applied. Thus, it is preferable to use the electric connection member of the present invention for automotive glass plates, particularly glass plates for rear windows which are often provided with electric heating wires for defoggers.

For the above-described terminal-equipped glass plate structure, an example has been described in which the electric connection member according to the first embodiment is used, and since the same applies to other electric connection members, descriptions thereof are omitted. The electric connection member 10 of the present invention can also be used for electric connection to antennas and camera portion heaters on glass plates, wipe heaters, backlights, sensors such as rain sensors, solar cells and the like, each of which has a conductive connection portion on a glass plate.

EXAMPLES

Hereinafter, the present invention will be described in furthermore detail by way of Examples, which should not be construed as limiting the present invention.

Various physical properties were measured as follows.

[First Compressive Stress of Conductive Member]

For the compressive stress of the conductive member in compression by 25% (first compressive stress), a load (N) necessary for compression by 25% in the thickness from non-pressurization was measured at 25° C., and divided by the cross-sectional area of the conductive member to calculate the compressive stress (N/mm$^2$). The load was measured using a material tester (trade name "STROGRAPH VE5D" manufactured by Toyo Seiki Seisaku-sho, Ltd.). The cross-sectional area of the conductive member is an average of the areas of the conductive member on the upper surface and the lower surface.

[Second Compressive Stress of Conductive Member]

By the same method as the method for measuring the first compressive stress, the conductive member was compressed by 25% and held at 105° C. for 22 hours. Thereafter, the conductive member was relieved from the compressive stress, and left to stand at 25° C. for 30 minutes. Subsequently, the compressive stress in compression by 25% was measured by the same method as in the case of the first compressive method, and taken as the second compressive stress.

[Electric Resistance in Compression by 25%]

The electric resistance of the conductive member in compression by 25% was measured by the method described herein.

[Elongation of Fixing Member]

Both surfaces of the fixing member were each bonded to a SUS 304 plate jig specified in JIS G4305. Thereafter, in an environment at 25° C., the SUS 304 plate jig was gripped in "AUTOGRAPH AGS-X" (manufactured by Shimadzu Corporation), and the fixing member was drawn in the thickness direction, and maintained for 30 minutes while being placed under a load of 96 kPa. Thereafter, the thickness-direction elongation of the fixing member relieved from the load was measured in the above material tester.

[Elongation and Elastic Modulus of Pressure-Sensitive Adhesive Layer at Breakage]

A pressure-sensitive adhesive layer having a thickness equal to that of the pressure-sensitive adhesive layer of each fixing member was formed on one surface of a release film (trade name "SP3000-75" manufactured by TOYO CLOTH CO., LTD.) in accordance with the procedure during preparation of the fixing member. The film was processed to a size of 10 mm×200 mm, the pressure-sensitive adhesive layer was then peeled from the release sheet, and both ends of the pressure-sensitive adhesive layer were gripped in the chuck of the material tester (trade name "AUTOGRAPH AGS-X" manufactured by Shimadzu Corporation).

Thereafter, using the material tester in an environment at 25° C., the fixing member was drawn at a tension speed of 5 mm/min, and an S-S curve was prepared to measure the elongation and the elastic modulus of the pressure-sensitive adhesive layer at breakage. The tensile strength at an elongation of 100 μm and the tensile strength at an elongation at breakage were measured in accordance with JIS Z0237, "8. Tensile Strength and Elongation", and the elastic modulus was calculated from the ratio of the tensile strength to the elongation,

[Gel Fraction of Pressure-Sensitive Adhesive Layer]

Measurement was performed by the method described herein.

[tan δ of Base Material]

The tan δ of the base material was measured by dynamic viscoelasticity measurement. The dynamic viscoelasticity measurement was performed at a frequency of 10 Hz at a temperature rise rate of 5° C./min from −50 to 150° C. in a tensile mode using a dynamic viscoelasticity measuring apparatus (trade name "DVA-200" manufactured by IT INSTRUMENTATION & CONTROL K.K.), and the value of tan δ at 85° C. was read.

[Preparation of Conductive Member 1]

First, a mold in which a pin of a ferromagnetic material is embedded was prepared, and a silicone rubber as a liquid rubber in which silver-coated nickel particles with a mean particle size of 35 μm are blended as a conductive filler was poured into the mold to form a conductive member comprising a conductive portion composed of a conductive rubbery elastomer and an insulating portion surrounding the conductive portion. The content of the conductive filler in the conductive portion was 33 vol %.

In the formation of the conductive member, a resin sheet which is a PET sheet having one through-hole for insertion of the conductive member and having a thickness of 100 μm was inserted into the mold to obtain a conductive member 1 with a joining member in which the conductive member is formed integrally with the inside of the through-hole of the resin sheet (hereinafter, also referred to simply as a "conductive member 1"; the same applies to the conductive member 2 and subsequent conductive members). The conductive member had a resin sheet (joining member) embedded in an insulating portion, and had a structure shown in FIG. 1, and the conductive portion had a circular shape. The joining member was provided with one conductive member as shown in FIG. 7. The joining member had a size of 40 mm×40 mm. The filling factor of the conductive filler in the conductive portion was 33 vol %. The conductive filler was arrayed so as to continue in the thickness direction. Table 1 shows details of the conductive member.

[Preparation of Conductive Members 2 to 4]

The number of through-holes for insertion of the conductive member, which were provided on the resin sheet, was changed to adjust the number of conductive members provided on each joining member as shown in Table 1. In the conductive members 2 and 3 with a joining member, a plurality of conductive members were arranged in one row as shown in FIG. 8, and in the conductive member 4 with a joining member, two rows each consisting of two conductive members were provided as shown in FIG. 3. The joining members in the conductive members 2 to 4 had sizes of 40×60 mm, 40×80 mm and 40×40 mm, respectively. Except for the above, the conductive members each had the same configuration as that of the conductive member 1.

[Preparation of Conductive Members 5 to 7]

The conductive members 5 to 7 were prepared in the same manner as in the case of the conductive member 2 except that the dimensions of the conductive members and the through-holes were changed as shown in Table 1.

[Preparation of Conductive Member 8]

The resin sheet was provided with one square through-hole, and one square conductive member (4 mm square, equivalent to a diameter of 4.5 mm) was provided on a joining member. The conductive member was formed in its entirety by crosslinking and curing a liquid silicone rubber containing silver particles having a mean particle size of 35 μm. The content of the conductive filler in the conductive rubbery elastomer was 43 vol %). Except for the above, the conductive member was the same as the conductive member 1.

(Fixing Member 1)

An acryl-based pressure-sensitive adhesive was prepared by blending 4 parts by mass of an isocyanate-based crosslinker (trade name "CORONATE L-55E" manufactured by TOSOH CORPORATION) as a crosslinker and 1 part by mass of a silane coupling agent based on 100 parts by mass of a main agent consisting of an acryl-based polymer (molecular weight distribution=1.5 and weight average molecular weight=900,000) synthesized by living radical polymerization and containing 2-ethylhexyl acrylate as a main monomer and a hydroxyl group as a polar group, and a tackifier resin. The acryl-based pressure-sensitive adhesive was applied to both surfaces of a 100 μm-thick PET film as a base material, and dried by heating to form a 50 μm-thick pressure-sensitive adhesive layer on each of both surfaces of the base material, thereby obtaining a double sided pressure-sensitive adhesive tape (fixing member 1). Table 2 shows details of the fixing member.

(Fixing Member 2)

An acryl-based pressure-sensitive adhesive was prepared by blending 2.1 parts by mass of an isocyanate-based crosslinker (trade name "CORONATE L-55E" manufactured by TOSOH CORPORATION) as a crosslinker and 1 part by mass of a silane coupling agent based on 100 parts by mass of a main agent comprising an acryl-based polymer (molecular weight distribution=1.5 and weight average molecular weight=500,000) synthesized by living radical polymerization and containing n-butyl acrylate as a main monomer and a hydroxyl group as a polar group, and a tackifier resin. The acryl-based pressure-sensitive adhesive was applied to both surfaces of a 100 μm-thick PET film as a base material, and dried by heating to form a 50 μm-thick pressure-sensitive adhesive layer on each of both surfaces of the base material, thereby obtaining a double sided pressure-sensitive adhesive tape (fixing member 2).

(Fixing Member 3)

An acryl-based pressure-sensitive adhesive was prepared by blending 4 parts by mass of an isocyanate-based crosslinker (trade name "CORONATE L-55E" manufactured by TOSOH CORPORATION) as a crosslinker and 1 part by mass of a silane coupling agent based on 100 parts by mass of a main agent comprising an acryl-based polymer (trade name "SCT 101" manufactured by Soken Chemical & Engineering Co., Ltd.; molecular weight distribution=5 to 8 and weight average molecular weight=1,100,000), and a tackifier resin. The obtained acryl-based pressure-sensitive adhesive was applied to both surfaces of a 100 μm-thick PET film as a base material, and dried by heating to form a 50 μm-thick pressure-sensitive adhesive layer on each of both surfaces of the base material, thereby obtaining a double sided pressure-sensitive adhesive tape (fixing member 3).

(Preparation of Electric Connection Member)

Example 1

The fixing member 1 being a double sided pressure-sensitive adhesive tape was cut to a quadrangular frame shape having an outer periphery fitted to the size of the joining member and having a width of 10 mm, and the double sided pressure-sensitive adhesive tape was bonded to both surfaces of the joining member of the conductive member 1 with a joining member to obtain an electric connection member having a configuration shown in FIG. 7.

Examples 2 and 3

The fixing member 1 being a double sided pressure-sensitive adhesive tape was cut to a quadrangular frame shape having an outer periphery fitted to the size of the joining member and having a width of 10 mm, and the double sided pressure-sensitive adhesive tape was bonded to both surfaces of the joining member of each of the conductive members 2 and 3 with a joining member to obtain electric connection members having the same configuration as that shown in FIG. 8 except for the number of conductive members.

Example 4

The fixing member 1 being a double sided pressure-sensitive adhesive tape was cut to a quadrangular frame shape having an outer periphery fitted to the size of the joining member and having a width of 10 mm, and the double sided pressure-sensitive adhesive tape was bonded to both surfaces of the joining member of the conductive member 4 with a joining member to obtain an electric connection member having the same configuration as that shown in FIG. 3.

Examples 5 and 6

The fixing member 1 being a double sided pressure-sensitive adhesive tape was cut to a quadrangular frame shape having an outer periphery fitted to the size of the joining member and having a width of 10 mm, and the double sided pressure-sensitive adhesive tape was bonded to both surfaces of the joining member of each of the conductive members 5 and 6 with a joining member to obtain electric connection members having the same configuration as that shown in FIG. 8 except for the number of conductive members.

Example 7

The fixing member 2 being a double sided pressure-sensitive adhesive tape was cut to a quadrangular frame shape having an outer periphery fitted to the size of the joining member and having a width of 10 mm, and the fixing member 2 composed of a double sided pressure-sensitive adhesive tape was bonded to both surfaces of the joining member of the conductive member 2 with a joining member to obtain an electric connection member having the same configuration as that shown in FIG. 8 except for the number of conductive members.

Example 8

The fixing member 1 being a double sided pressure-sensitive adhesive tape was cut to a quadrangular frame shape having an outer periphery fitted to the size of the joining member and having a width of 10 mm, and the fixing member 1 composed of a double sided pressure-sensitive adhesive tape was bonded to both surfaces of the joining member of the conductive member 8 with a joining member to obtain an electric connection member of Example 8 having the same configuration as that shown in FIG. 7 except for the shape of the conductive member.

Comparative Example 1

The fixing member 3 being a double sided pressure-sensitive adhesive tape was cut to a quadrangular frame shape having an outer periphery fitted to the size of the joining member and having a width of 10 mm, and the double sided pressure-sensitive adhesive tape was bonded to both surfaces of the joining member of the conductive member 2 with a joining member to obtain an electric connection member of Comparative Example 1 having the same configuration as that shown in FIG. 8 except for the number of conductive members.

Comparative Example 2

The fixing member 1 being a double sided pressure-sensitive adhesive tape was cut to a quadrangular frame shape having an outer periphery fitted to the size of the joining member and having a width of 10 mm, and the double sided pressure-sensitive adhesive tape was bonded to both surfaces of the joining member of the conductive member 7 with a joining member to obtain an electric connection member of Comparative Example 2 having the same configuration as that shown in FIG. 8 except for the number of conductive members.

[Evaluation on Temperature Rise]

Figure 15:
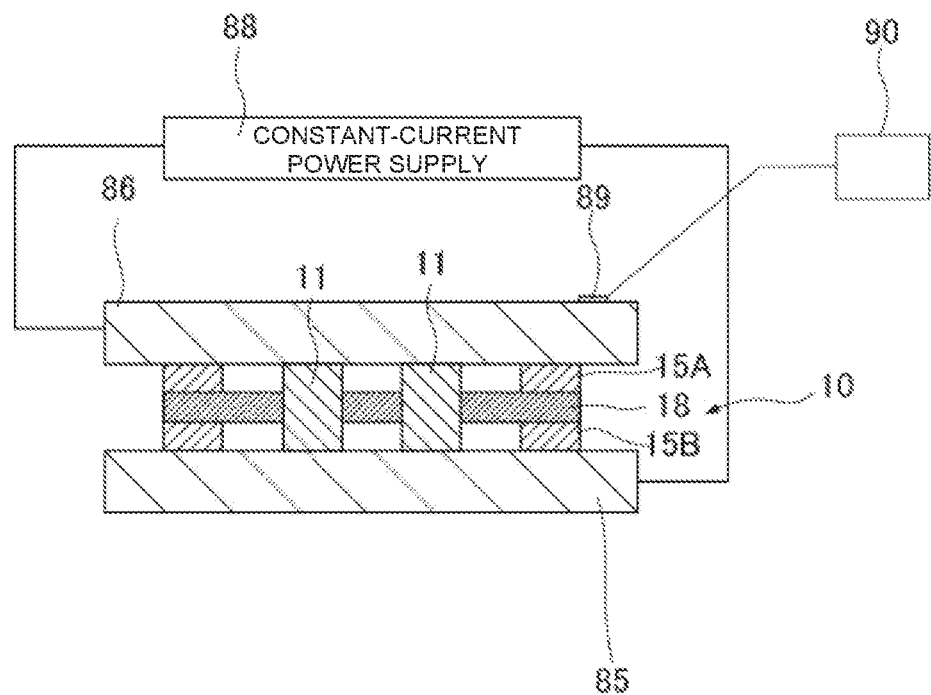
FIG. 15 is a schematic view showing a measuring apparatus for evaluating the performance of the electric connection member in Examples and Comparative Examples.

As shown in FIG. 15, the electric connection member 10 obtained from each of Examples and Comparative Examples was incorporated into an evaluation apparatus. Specifically, the electric connection member 10 was sandwiched between two copper plates 85 and 86 so as to compress the conductive member 11 to 0.5 mm (compression ratio: 28.5%). Fixing members 15A and 15B provided on both surfaces of the electric connection member 10 were bonded to the copper plates 85 and 86. A constant-current source 88 was connected between the copper plates 86 and 87, and a thermocouple 89 was mounted on one copper plate 86. A temperature indicator 90 displaying a temperature measured by the thermocouple 89 was connected to the thermocouple 89.

After construction of the evaluation apparatus, a constant electric current of 26A was applied from the constant-current source 88. The surface temperature of the copper plate 86 after 30 minutes of the application of the electric current was set to an equilibrium temperature, and measured using the thermocouple 89. The reason why the temperature after 30 minutes was set to an equilibrium temperature is as follows. Application of an electric current causes heating by electric power, so that the evaluation apparatus is heated, has a temperature higher than the outside temperature, and releases heat. When an electric current is applied for a certain time, the amount of heating by the electric power becomes equal to the amount of heat discharge due to a difference between the outside temperature and the temperature of the evaluation apparatus. This is called an equilibrium state, and this state is achieved after about 20 minutes of application of an electric current. Thereafter, the temperature of the evaluation remains constant. In the present evaluation, the temperature was observed after 30 minutes of application of an electric current at which the equilibrium state is reliably achieved. After observation of the equilibrium temperature at the first cycle, the evaluation apparatus was brought back to the outside temperature. The above operation was repeated three times, and on the basis of the difference between the equilibrium temperatures at the first cycle and the third cycle, evaluation was performed in accordance with the following criteria. Tables 3 and 4 show the results.

A: The difference between the equilibrium temperatures is 2° C. or less.
B: The difference between the equilibrium temperatures is more than 2° C. and 5° C. or less.
C: The difference between the equilibrium temperatures is more than 5° C.

TABLE 1

| Conductive member No. | | 1 | 2 | 3 | 4 | 5 | 6 | 7 | 8 |
|---|---|---|---|---|---|---|---|---|---|
| Diameter of conductive portion | mm | 2.0 | 2.0 | 2.0 | 2.0 | 1.25 | 2.6 | 0.8 | 4 mm square |
| Diameter of conductive member | mm | 3.0 | 3.0 | 3.0 | 3.0 | 3.0 | 3.6 | 3.0 | 4 mm square |
| Number of conductive portions | | 1 | 2 | 3 | 4 | 2 | 2 | 2 | 1 |
| Thickness of conduction portion (initial value, H0) | mm | 0.70 | 0.70 | 0.70 | 0.70 | 0.70 | 0.70 | 0.70 | 0.70 |
| Thickness of conduction portion (after compression, H1) | mm | 0.50 | 0.50 | 0.50 | 0.50 | 0.50 | 0.50 | 0.50 | 0.50 |
| Diameter of through-hole | mm | 2.0 | 2.0 | 2.0 | 2.0 | 2.0 | 2.6 | 2.0 | 4.0 |
| First compressive stress (compression by 25%) | N/mm$^2$ | 3.3 | 3.3 | 3.3 | 3.3 | 2.0 | 3.4 | 0.9 | 6.3 |
| Second compressive stress (compression by 25%) | N/mm$^2$ | 0.8 | 0.8 | 0.8 | 0.8 | 0.7 | 0.9 | 0.4 | 1.9 |
| Resistance value in compression by 25% | mΩ | 2 | 1 | 1 | 1 | 10 | 1 | 35 | 30 |
| Hardness of conductive portion with durometer A | | 78 | 78 | 78 | 78 | 73 | 79 | 79 | 45 |
| Hardness of insulating portion with durometer A | | 35 | 35 | 35 | 35 | 35 | 35 | 35 | — |

TABLE 2

| | | | Fixing member 1 | Fixing member 2 | Fixing member 3 |
|---|---|---|---|---|---|
| Pressure sensitive adhesive agent | Type | | Acryl-based | Acryl-based | Acryl-based |
| | Gel fraction | Mass % | 45% | 45% | 59% |
| | Thickness of layer (μm) | μm | 50 | 50 | 50 |
| | Elongation ratio at breakage | % | 1157% | 1083% | 920% |
| | Elastic modulus | MPa | 0.0237 | 0.0296 | 0.0143 |
| Base material | Type | | PET | PET | PET |
| | Thickness (μm) | μm | 100 | 100 | 100 |
| | Tan δ(85° C.) | | 0.0231 | 0.0231 | 0.0231 |
| Elongation of fixing member (96 kPa, 30 min) | | μm | 88 | 322 | 2044 |

TABLE 3

| | Example 1 | Example 2 | Example 3 | Example 4 | Example 5 |
|---|---|---|---|---|---|
| Fixing member | Fixing member 1 | Fixing member 1 | Fixing member 1 | Fixing member 1 | Fixing member 1 |
| Conductive member | Conductive member 1 | Conductive member 2 | Conductive member 3 | Conductive member 4 | Conductive member 5 |

TABLE 3-continued

|  | Example 1 | Example 2 | Example 3 | Example 4 | Example 5 |
|---|---|---|---|---|---|
| Diameter of conductive portion (mm) | 2.0 | 2.0 | 2.0 | 2.0 | 1.25 |
| Number of conductive portions | 1 | 2 | 3 | 4 | 2 |
| Electric current | 26 A | 26 A | 26 A | 26 A | 26 A |
| Application time | 30 min | 30 min | 30 min | 30 min | 30 min |
| Application cycle | 3 cycle | 3 cycle | 3 cycle | 3 cycle | 3 cycle |
| Outside temperature | 23° C. | 17° C. | 21° C. | 24° C. | 19° C. |
| Equilibrium temperature (first cycle) | 38° C. | 26° C. | 21° C. | 27° C. | 30° C. |
| Equilibrium temperature (second cycle) | 38° C. | 26° C. | 23° C. | 27° C. | 30° C. |
| Equilibrium temperature (third cycle) | 40° C. | 25° C. | 23° C. | 28° C. | 30° C. |
| Evaluation on temperature rise | A | A | A | A | A |

TABLE 4

|  | Example 6 | Example 7 | Example 8 | Comparative Example 1 | Comparative Example 2 |
|---|---|---|---|---|---|
| Fixing member | Fixing member 1 | Fixing member 2 | Fixing member 1 | Fixing member 3 | Fixing member 1 |
| Conductive member | Conductive member 6 | Conductive member 2 | Conductive member 8 | Conductive member 2 | Conductive member 7 |
| Diameter of conductive portion (mm) | 2.6 | 2.0 | 4 mm square | 2.0 | 0.8 |
| Number of conductive portions | 2 | 2 | 1 | 2 | 2 |
| Electric current | 26 A | 26 A | 26 A | 26 A | 26 A |
| Application time | 30 min | 30 min | 30 min | 30 min | 30 min |
| Application cycle | 3 cycle | 3 cycle | 3 cycle | 3 cycle | 3 cycle |
| Outside temperature | 18° C. | 23° C. | 22° C. | 23° C. | 22° C. |
| Equilibrium temperature (first cycle) | 23° C. | 35° C. | 38° C. | 38° C. | 42° C. |
| Equilibrium temperature (second cycle) | 24° C. | 36° C. | 39° C. | 42° C. | 48° C. |
| Equilibrium temperature (third cycle) | 24° C. | 38° C. | 40° C. | 45° C. | 53° C. |
| Evaluation on temperature rise | A | B | A | C | C |

Thus, in Examples, the elongation of the fixing member in the thickness direction was kept below a certain value while the first and second compressive stresses of the conductive member were set within a predetermined range, and consequently, it was possible to suppress temperature rise with time even when a large amount of electric current was applied to the conductive member.

REFERENCE SIGNS LIST 10, 20, 30, 40 Electric connection member
11 Conductive member
11A Upper surface
11B Lower surface
12 Conductive portion
12B Conductive filler
13 Insulating portion
15, 15A, 15B, 25, 35, 35A, 35B, 45 Fixing member
16A Base material
16B, 16C Pressure-sensitive adhesive layer
18 Joining member
18A Through-hole
22 External sheet member
70 Terminal-Equipped Glass plate structure
71 Terminal
72 Glass plate
73 Conductive layer (connection target member)

The invention claimed is:

1. An electric connection member comprising: a conductive member; and a fixing member which brings the conductive member into contact with a connection target member and holds the conductive member in a state of compression in a thickness direction,
wherein the conductive member has a compressive stress of 1.01 N/mm$^2$ or more and 15.0 N/mm$^2$ or less when compressed by 25% in the thickness direction, and
the fixing member has an elongation of 400 μm or less when drawn at 96 kPa for 30 minutes in a direction along the thickness direction.

2. The electric connection member according to claim 1, wherein the fixing member is a pressure-sensitive adhesive layer, or comprises a base material and a pressure-sensitive adhesive layer provided on each of both surfaces of the base material.

3. The electric connection member according to claim 2, wherein the pressure-sensitive adhesive layer has an elongation ratio of 1000% or more at breakage in tension in a direction along the thickness direction, and an elastic modulus of 0.02 MPa or more.

4. The electric connection member according to claim 2, wherein the base material has a loss tangent tan δ of 0.08 or less at 85° C. in evaluation of dynamic viscoelasticity in a tensile mode at 10 Hz.

5. The electric connection member according to claim 1, wherein the conductive member comprises a conductive portion having conductivity, and
the conductive portion has a diameter of 1.0 to 3.0 mm.

6. The electric connection member according to claim 1, wherein the conductive member has a thickness of 0.2 to 1.5 mm.

7. The electric connection member according to claim 1, wherein the number of the conductive members is 1 to 10.

8. The electric connection member according to claim 1, wherein the entire conductive member is composed of a conductive rubbery elastomer, and
the rubbery elastomer comprises a conductive filler at 25 to 90 vol %.

9. The electric connection member according to claim 1, wherein the conductive member comprises a columnar conductive portion composed of a conductive rubbery elastomer, and an insulating portion surrounding the periphery of the columnar conductive portion and composed of an insulating rubbery elastomer, and the conductive rubbery elastomer forming the columnar conductive portion comprises a conductive filler at 25 to 80 vol %.

10. The electric connection member according to claim 1, wherein the conductive member comprises a conductive portion comprising a conductive filler, and the conductive filler is arrayed in the thickness direction.

11. The electric connection member according to claim 1, wherein the conductive member is a rubbery elastomer covered externally with a conductive layer, or a metal spring.

12. The electric connection member according to claim 1, further comprising a joining member joining the conductive member to the fixing member.

13. A terminal-equipped glass plate structure, comprising: the electric connection member according to claim 1; a glass plate having a conductive layer provided on at least one surface thereof; and a terminal, wherein the electric connection member is disposed between the terminal and the conductive layer, the terminal is connected to the conductive layer through the conductive member, and the terminal is fixed to the glass plate by the fixing member.

14. An electric connection member comprising: a conductive member; and a fixing member which brings the conductive member into contact with a connection target member and holds the conductive member in a state of compression in a thickness direction, wherein the conductive member has a compressive stress of 0.5 N/mm$^2$ or more and 6.0 N/mm$^2$ or less when compressed in the thickness direction, held in a state of compressive deformation by 25% at 105° C. for 22 hours, then freed from the applied load, relieved from the compressive stress, and compressed by 25% in the thickness direction again, and the fixing member has an elongation of 400 μm or less when drawn at 96 kPa for 30 minutes in a direction along the thickness direction.

* * * * *